United States Patent
Kishida

(10) Patent No.: US 8,810,815 B2
(45) Date of Patent: Aug. 19, 2014

(54) IMAGE READING SYSTEM, IMAGE READING APPARATUS, AND CONTROL METHODS AND PROGRAMS THEREOF

(75) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/256,506

(22) PCT Filed: Jul. 26, 2011

(86) PCT No.: PCT/JP2011/067572
§ 371 (c)(1),
(2), (4) Date: Sep. 14, 2011

(87) PCT Pub. No.: WO2012/023417
PCT Pub. Date: Feb. 23, 2012

(65) Prior Publication Data
US 2012/0257233 A1    Oct. 11, 2012

(30) Foreign Application Priority Data
Aug. 18, 2010   (JP) .................................. 2010-183388

(51) Int. Cl.
*G06F 3/12*    (2006.01)

(52) U.S. Cl.
USPC ........................................ 358/1.13; 358/1.15

(58) Field of Classification Search
None
See application file for complete search history.

(56) References Cited

U.S. PATENT DOCUMENTS

| 2006/0195495 A1 | 8/2006 | Asano | |
|---|---|---|---|
| 2008/0024818 A1* | 1/2008 | Ito | 358/1.15 |
| 2009/0190163 A1* | 7/2009 | Sato | 358/1.15 |

FOREIGN PATENT DOCUMENTS

| JP | 2005-184748 A | 7/2005 |
|---|---|---|
| JP | 2006-238199 A | 9/2006 |
| JP | 2009-145970 A | 7/2009 |

* cited by examiner

*Primary Examiner* — Vincent Rudolph
*Assistant Examiner* — Marcus T Riley
(74) *Attorney, Agent, or Firm* — Fitzpatrick, Cella, Harper & Scinto

(57) ABSTRACT

The image reading apparatus selects a transmission destination information processing apparatus to which image data read from an original is to be transmitted, refers to registered information registered in advance in a memory, and when the selected transmission destination information processing apparatus has not been registered as an information processing apparatus for executing the specific scan mode, transmits identification information for identifying the image reading apparatus, and displays a screen for receiving a scan execution instruction on a display when a notification indicating that the transmission destination information processing apparatus is available as the information processing apparatus for executing the specific scan mode has been received.

10 Claims, 17 Drawing Sheets

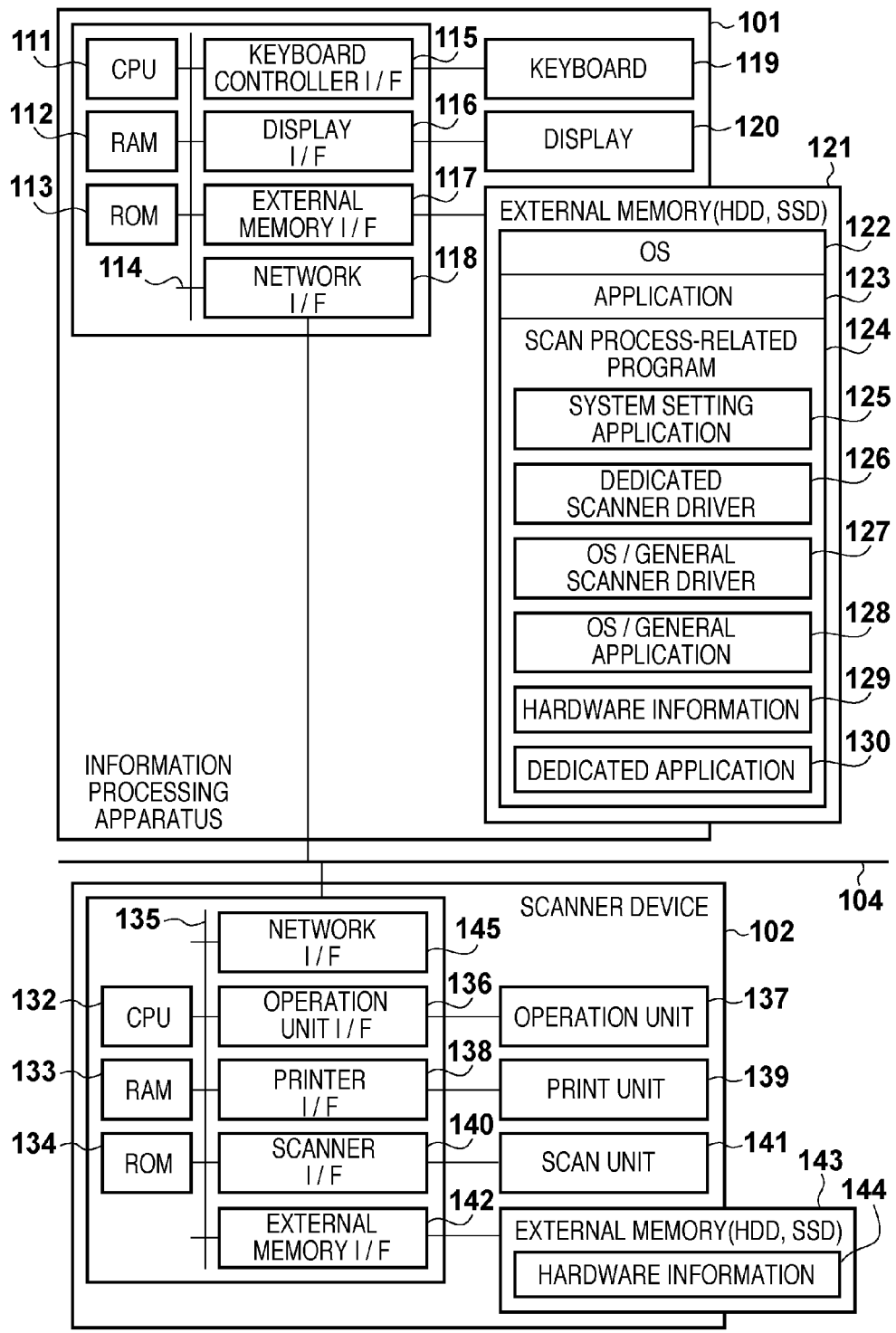

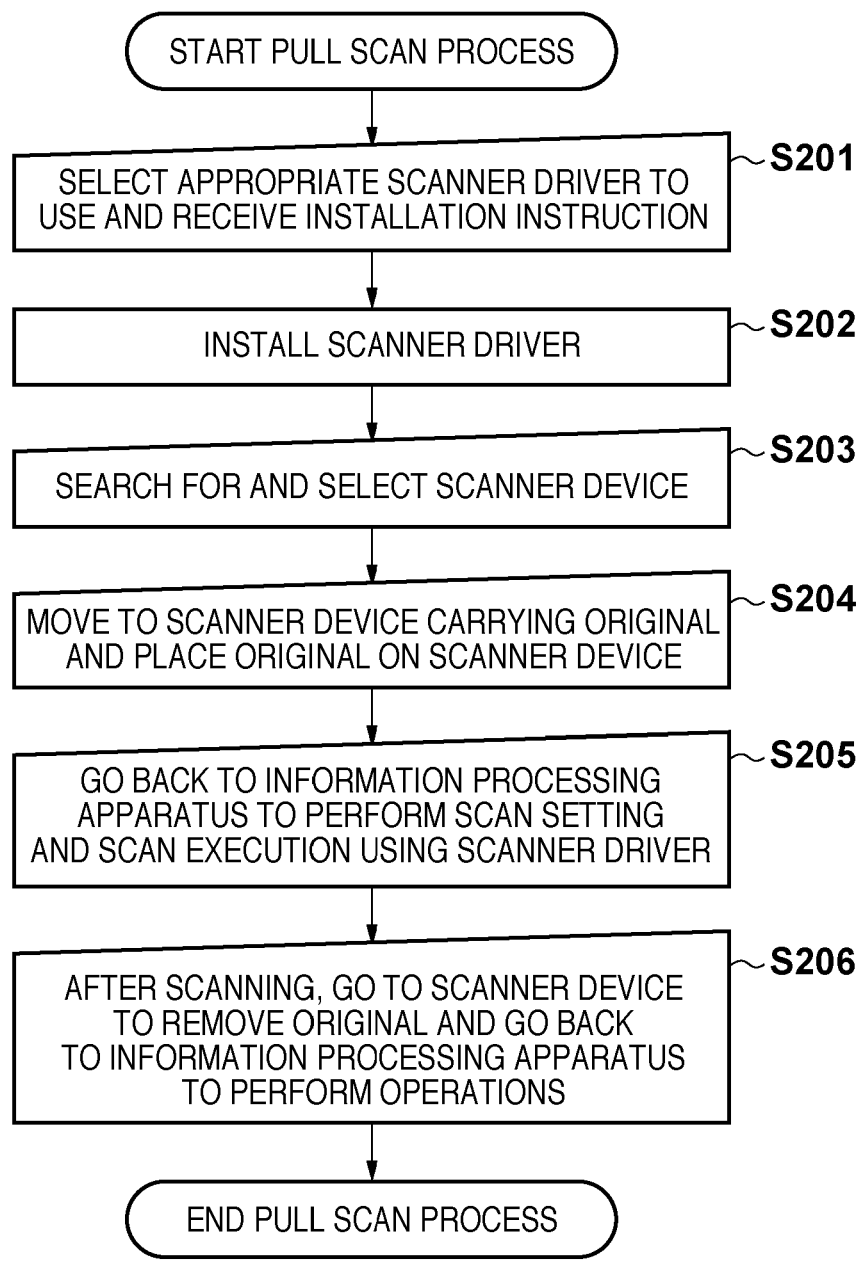

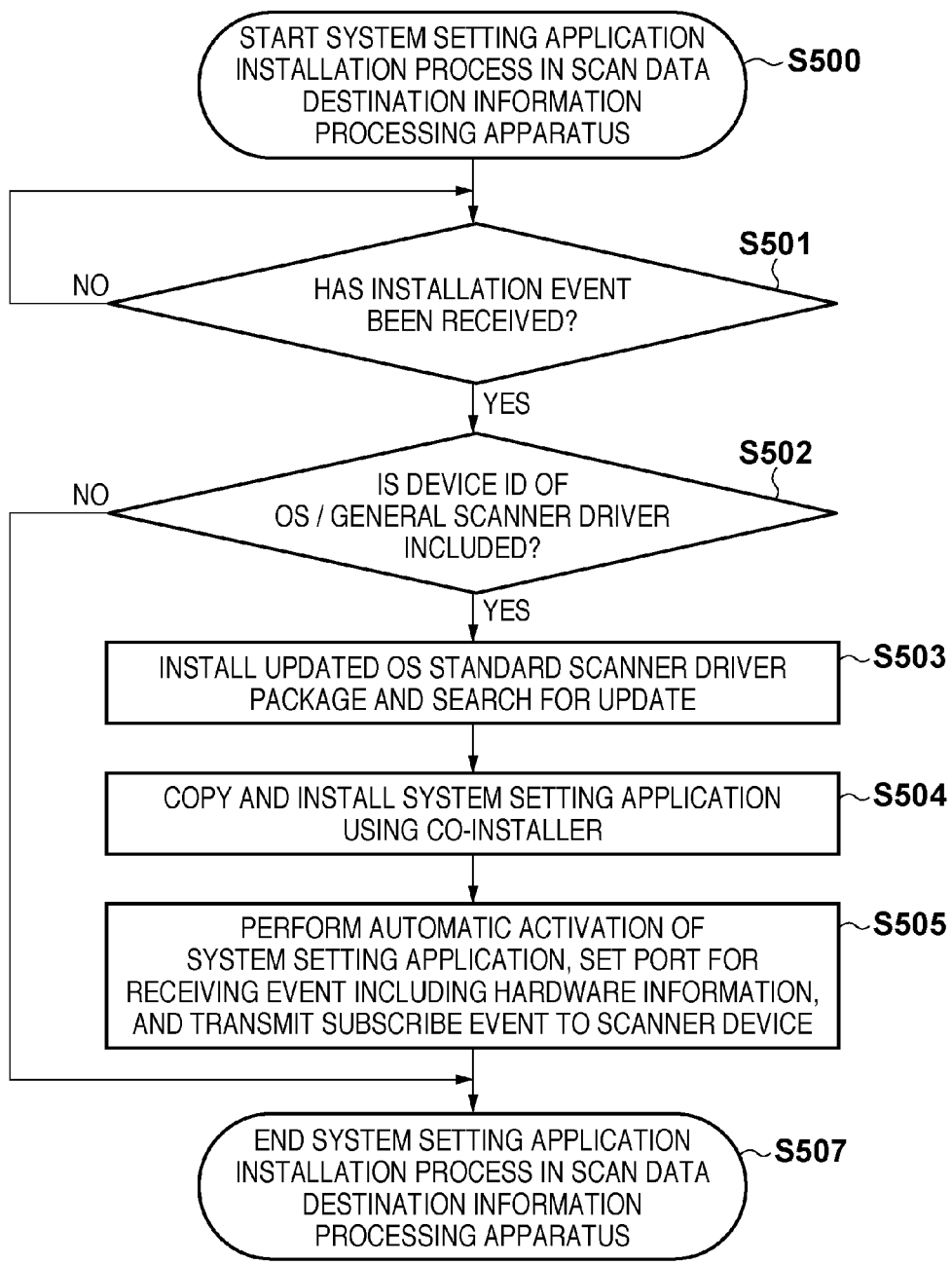

FIG. 11

| HARDWARE ID #1 | 6bdd1fc6-810f-11d0-bec7-08002be2092f |
| --- | --- |
| HARDWARE ID #2 | 1abc1ab1-111a-11a1-abc1-11111ab-1111a |
| MAC ADDRESS | AA-BB-CC-DD-EE-01 |
| IP ADDRESS | aaa. bbb. ccc. 123 |
| PROTOCOL #1 | Vendor Network Protocol |
| PROTOCOL #2 | Generic Scanner Protocol |
| RECOMMENDED APPLICATION | DEDICATED APPLICATION |
| SCAN SETTINGS INFORMATION | 300 dpi, Color, AUTO IMAGE SIZE, ... |

F I G. 15

| INSTALLATION RESULT | SUCCESS (OR FAIL) |
|---|---|
| DRIVER NAME | DEDICATED SCANNER DRIVER |
| DRIVER VERSION | 1. 20 |
| DRIVER DATE | 2009 / 11 / 12 |
| REGISTERED APPLICATION | DEDICATED APPLICATION |
| SCAN SETTING RESULT | 300 dpi, Color, A4, AUTO IMAGE SIZE |

IMAGE READING SYSTEM, IMAGE READING APPARATUS, AND CONTROL METHODS AND PROGRAMS THEREOF

TECHNICAL FIELD

The present invention relates to an image reading system, an image reading apparatus, and control methods and programs thereof.

BACKGROUND ART

In order to use a peripheral device, such as a scanner device, through an information processing apparatus, it is necessary to install a specific device driver for the peripheral device (a scanner driver, in the case where the peripheral device is a scanner device) in an operating system (OS) running on the information processing apparatus. Accordingly, if a plurality of scanner devices are used, it is necessary to install the same number of scanner drivers as there are scanner devices, and therefore for each scanner device, it is necessary for a user to perform a cumbersome installation operation by checking the IP address and finding a scanner driver for the scanner device.

In view of this, recently, research and development of an OS/general scanner driver that can be used in any scanner device regardless of the type of scanner device are being carried out. For example, a method has been proposed in which scanning is performed by selecting an available network scanner device after a scan instruction has been issued from an application to the OS/general scanner driver. According to this method, it is possible to use all scanner devices supported by the OS/general scanner driver simply by preinstalling only the OS/general scanner driver in an information processing apparatus. Also, Japanese Patent Laid-Open No. 2009-145970 proposes a system in which when a management server receives a network participation message in unicast from a device, a driver for that device is push installed in each client PC, and thereby the usage environment is constructed and managed.

For various types of scan processing executed by a scanner device on a network using a scanner driver, the user needs to move back and forth between the information processing apparatus and the scanner device. For example, the user needs to specify a scanner device, perform association with the target scanner device, perform scan setting and activate the scanner driver on the information processing apparatus side, thereafter go to the scanner device to set an original, and then go back to the information processing apparatus to execute a scan process. Furthermore, after the scan process, the user needs to go to the scanner device to remove the original.

In view of this, a system has been recently proposed in which a network-compliant scanner driver performs a pseudo push scan function as a specific scan mode that can be easily used in USB interface-compliant scanner devices. "Pseudo push scan" is a scan process that transmits image data from a scanner device to an information processing apparatus as if pushing the data to the information processing apparatus. The internal operations are as follows. In response to a user operation, a signal for commencing the scan process is transmitted from the scanner device to the scan data destination information processing apparatus, and the information processing apparatus that has received the signal acquires image data via the scanner driver. The pseudo push scan system can use a scanner driver for pull scan provided in the OS and has the potential of reducing the load of functions mounted on the scanner device as compared to that of a genuine push scan system, and is therefore attracting attention.

However, the conventional technology has the following problems. For example, with the scanner device corresponding to the OS/general scanner driver as described above in the Description of the Related Art, unlike a scanner device that uses an USB interface, the information processing apparatus and the scanner device are not connected in one-to-one correspondence. Accordingly, in order to construct a pseudo push scan system, it is necessary to perform association with each scanner device and make scan process settings on the information processing apparatus side. Furthermore, if a plurality of information processing apparatuses are used, it is necessary to, for each information processing apparatus, perform cumbersome operations such as scan setting as described above. Accordingly, when scanning is performed with an information processing apparatus that the user uses for the first time, the user needs to first go to the information processing apparatus. If the information processing apparatus and the scanner device are distant from each other, user movements are required, which is a time consuming and laborious operation.

SUMMARY OF INVENTION

The present invention enables the realization of an image reading system and an image reading apparatus that cause a connected information processing apparatus to construct an environment for using the image reading apparatus without causing the user to go to the information processing apparatus, and enables the realization of control methods and programs thereof.

One aspect of the present invention provides an image reading system in which a plurality of information processing apparatuses and an image reading apparatus capable of executing a specific scan mode are connected, the image reading apparatus comprising: transmission destination selection means for selecting a transmission destination information processing apparatus to which image data read from an original is to be transmitted; transmission means for referring to registered information registered in advance in a memory and when the selected transmission destination information processing apparatus has not been registered as an information processing apparatus for executing the specific scan mode, transmitting identification information for identifying the image reading apparatus; and display control means for displaying a screen for receiving a scan execution instruction on a display when a notification indicating that the transmission destination information processing apparatus is available as the information processing apparatus for executing the specific scan mode has been received, and each information processing apparatus comprising: installation means for installing driver software corresponding to the image reading apparatus identified by the identification information when the identification information transmitted by the transmission means has been received; and notification means for, when the driver software has been installed by the installation means, sending, to the image reading apparatus, a notification indicating that the transmission destination information processing apparatus is available as the information processing apparatus for executing the specific scan mode.

Another aspect of the present invention provides an image reading apparatus that is connected to a plurality of information processing apparatuses and capable of executing a specific scan mode, the image reading apparatus comprising: transmission destination selection means for selecting a transmission destination information processing apparatus to which image data read from an original is to be transmitted; transmission means for referring to registered information registered in advance in a memory and when the selected transmission destination information processing apparatus has not been registered as an information processing apparatus for executing the specific scan mode, transmitting identification information for identifying the image reading apparatus; and display control means for displaying a screen for receiving a scan execution instruction on a display when a notification indicating that the transmission destination information processing apparatus is available as the information processing apparatus for executing the specific scan mode has been received.

Still another aspect of the present invention provides an image reading apparatus comprising: selection means for selecting an information processing apparatus to which image data read from an original is to be transmitted; transmission means for transmitting identification information for identifying the image reading apparatus to the information processing apparatus selected by the selection means; receiving means for receiving, from the information processing apparatus, a notification indicating that a driver software corresponding to the image reading apparatus is installed to the information processing apparatus based on the identification information; instruction transmission means for enabling a reception of a read start instruction from a user upon receiving the notification by the receiving means, and transmitting a transmission instruction of a read start request to the information processing apparatus upon receiving the read start instruction from the user; and control means for executing the read processing of the original, and transmitting generated image data to the information processing apparatus upon receiving the read start request transmitted from the information processing apparatus in response to the transmission instruction by the instruction transmission means.

Yet still another aspect of the present invention provides a method for controlling an image reading system in which a plurality of information processing apparatuses and an image reading apparatus capable of executing a specific scan mode are connected, the method comprising: with the image reading apparatus, selecting a transmission destination information processing apparatus to which image data read from an original is to be transmitted; referring to registered information registered in advance in a memory and when the selected transmission destination information processing apparatus has not been registered as an information processing apparatus for executing the specific scan mode, transmitting identification information for identifying the image reading apparatus; and displaying a screen for receiving a scan execution instruction on a display when a notification indicating that the transmission destination information processing apparatus is available as the information processing apparatus for executing the specific scan mode has been received, and with each information processing apparatus, installing driver software corresponding to the image reading apparatus identified by the identification information when the identification information transmitted in the transmission step has been received; and when the driver software has been installed in the installation step, sending, to the image reading apparatus, a notification indicating that the transmission destination information processing apparatus is available as the information processing apparatus for executing the specific scan mode.

Still yet another aspect of the present invention provides a method for controlling an image reading apparatus that is connected to a plurality of information processing apparatuses and capable of executing a specific scan mode, the method comprising: selecting a transmission destination information processing apparatus to which image data read from an original is to be transmitted; referring to registered information registered in advance in a memory and when the selected transmission destination information processing apparatus has not been registered as an information processing apparatus for executing the specific scan mode, transmitting identification information for identifying the image reading apparatus; and displaying a screen for receiving a scan execution instruction on a display when a notification indicating that the transmission destination information processing apparatus is available as the information processing apparatus for executing the specific scan mode has been received.

Yet still another aspect of the present invention provides a method for controlling an image reading apparatus, the method comprising: selecting an information processing apparatus to which image data read from an original is to be transmitted; transmitting identification information for identifying the image reading apparatus to the information processing apparatus selected by the selecting step; receiving, from the information processing apparatus, a notification indicating that a driver software corresponding to the image reading apparatus is installed to the information processing apparatus based on the identification information; enabling a reception of a read start instruction from a user upon receiving the notification by the receiving means, and transmitting a transmission instruction of a read start request to the information processing apparatus upon receiving the read start instruction from the user; and executing the read processing of the original, and transmitting generated image data to the information processing apparatus upon receiving the read start request transmitted from the information processing apparatus in response to the transmission instruction by the enabling step.

Still yet another aspect of the present invention provides a computer-readable storage medium storing a computer program for causing a computer to execute the method for controlling the image reading system.

Yet still another aspect of the present invention provides a computer-readable storage medium storing a computer program for causing a computer to execute the method for controlling the image reading apparatus.

Further features of the present invention will be apparent from the following description of exemplary embodiments with reference to the attached drawings.

BRIEF DESCRIPTION OF DRAWINGS

FIG. 1B is a block diagram showing examples of the configurations of an information processing apparatus and a scanner device according to the embodiment of the present invention.

FIG. 2 is a flowchart illustrating a pull scan process according to a comparative example.

FIG. 5 is a flowchart illustrating an example of a system setting application installation process performed by the information processing apparatus according to the embodiment of the present invention.

FIG. 11 is a diagram showing an example of hardware information according to the embodiment of the present invention.

FIG. 15 is a diagram showing an example of a scan environment construction event according to the embodiment of the present invention.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment
Configuration of Image Reading System

An image reading system according to the present embodiment will be described first with reference to FIG. 1A. The configuration described below is merely an example and is not intended to limit the scope of the present invention. Simple Object Access Protocol (SOAP) and WS-Eventing, which will be mentioned below, are information that has been published at W3C (http://www.w3.org/) and (http://www.w3.org/Submission/WS-Eventing/), respectively, and thus descriptions thereof are omitted here.

Figure 1A:
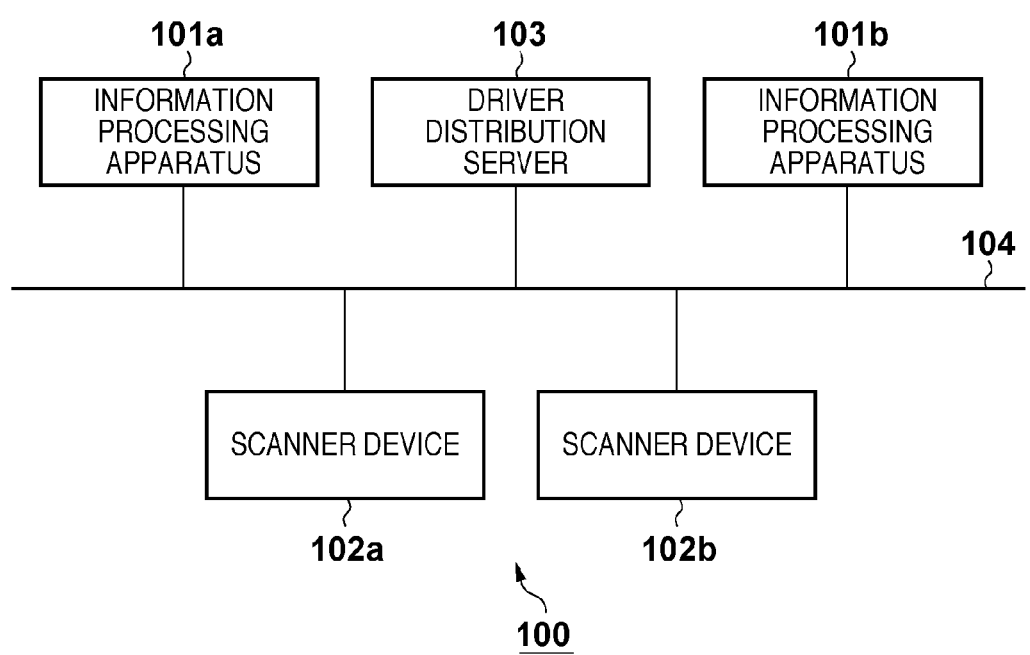
FIG. 1A is a diagram showing an example of the configuration of an image reading system according to an embodiment of the present invention.

As shown in FIG. 1A, an image reading system 100 includes information processing apparatuses (personal computers, or PCs) 101a and 101b, scanner devices 102a and 102b, which are image reading apparatuses, and a driver distribution server 103. These apparatuses are connected via a network (LAN) 104 implemented as Ethernet®. Hereinafter, the information processing apparatuses 101a and 101b will be referred to simply as an information processing apparatus 101, and the scanner devices 102a and 102b will be referred to as a scanner device 102, in cases where it is unnecessary to distinguish them from each other. The scanner device 102 reads an original, generates image data and transmits the image data to the information processing apparatus 101.

Example of Configuration of Each Apparatus
The apparatus configurations of the information processing apparatus 101 and the scanner device 102 will be described next with reference to FIG. 1B. In the information processing apparatus 101, a CPU 111 performs overall control of the devices connected to a system bus 114 in accordance with a program stored in a RAM 112. The RAM 112 also functions as the main memory, a working area and the like for the CPU 111. A ROM 113 stores various types of programs and data.

A keyboard controller I/F 115 controls key input from a keyboard 119 or a pointing device (not shown) such as a mouse. A display I/F 116 controls displays in a display 120. An external memory I/F 117 controls access to an external memory 121 such as a hard disk (HD) or a solid state disk (SSD). The external memory 121 functions as a computer-usable or readable storage medium storing an operating system program (hereinafter referred to as OS) 122, various types of applications 123, scan process-related programs 124, user files, an editing file and so on.

The scan process-related programs 124 include a system setting application 125, a dedicated scanner driver 126, an OS/general scanner driver 127, an OS/general application 128, hardware information 129, and a dedicated application 130, according to the present embodiment. There are cases where the scan process-related programs 124 are not initially stored in the external memory 121 of the information processing apparatus 101 when it is newly used by the user. In the present embodiment, if the system setting application 125 that performs control to construct a scan system environment has not been stored, by remote control through the scanner device 102, the OS 122 performs an OS/general scanner driver update installation operation in the information processing apparatus 101. Furthermore, by remote control through the scanner device 102, in response to the installation operation, the system setting application 125 is copied in the external memory 121 and activated in the RAM 112. The process for installing the system setting application 125 in the scan data destination information processing apparatus 101, which is performed when the system setting application 125 is not stored or activated, will be described below in detail with reference to FIG. 5.

In the external memory 121, furthermore, the update installed OS/general scanner driver 127 and the OS/general application 128 are also stored. The OS/general scanner driver 127 and the OS/general application 128 can use the functions that are commonly provided in corresponding device models. On the other hand, the dedicated scanner driver 126 is a scanner driver that only supports a single device model. The dedicated scanner driver 126 can maximize the utilization of the functions of the corresponding scanner device. The dedicated application 130 is an application that is optimized to perform operations in cooperation with the system setting application 125 and the dedicated scanner driver 126 and that is capable of executing pseudo push scans. If the dedicated scanner driver 126 and the dedicated application 130 have not been stored in the external memory 121, the system setting application 125 performs the installation process.

The hardware information 129 is information sent from the scanner device 102, and the information received by the system setting application 125 from the scanner device 102 is temporarily stored in the external memory 121. A network I/F 118, which is connected to the scanner device 102 via the LAN 104, performs a process for controlling communication with the scanner device 102. In the present embodiment, since WS-Eventing is used for the event signals transmitted from the scanner device 102, the network I/F 118 implements a corresponding Web Service protocol. The driver distribution server 103 also has the same apparatus configuration as that of the information processing apparatus 101.

An example of the configuration of the scanner device 102 will be described next. A CPU 132 performs overall control of the operations of the scanner device 102. A RAM 133 functions as the main memory, a working area, and the like for the CPU 132, and is also used as an area in which input information is expanded and as an environment data storage area. The RAM 133 also includes an NVRAM (non-volatile RAM) area, and the memory capacity can be expanded by an optional RAM connected to an add-on port (not shown). A ROM 134 stores various types of fonts, a control program and the like executed by the CPU 132, and various types of data.

A network I/F 145 transmits and receives data to and from the information processing apparatus 101. A printer I/F 138 controls an interface with a print unit 139 serving as a printer engine. A scanner I/F 140 controls an interface with a scan unit 141 serving as a scanner engine.

Access to an external memory 143 is controlled by an external memory I/F 142. The external memory 143 includes a hard disk (HD), a solid state disk (SSD) or the like, which is connected as an option, and may store hardware information 144 of the image reading system 100. If the external memory 143 such as a hard disk is not connected, information and the like used by the information processing apparatus 101 is stored in the ROM 134.

An operation unit I/F 136 controls an interface with an operation unit 137 that performs scan process setting for the scanner device 102. The operation unit 137 is equipped with an operation panel that receives user operations, and the operation panel includes a switch for operation, an LED display device, and the like. It is also possible to provide an NVRAM (not shown), in which scan settings information from the operation panel may be stored.

The CPU 132 acquires image data from the scan unit 141 via the scanner I/F 140 based on the control program or the like stored in the ROM 134. Also, the CPU 132 is capable of performing processing for communication with the information processing apparatus 101 via the network I/F 145, and therefore the CPU 132 can transmit image data to the information processing apparatus 101 as well as notifying the information processing apparatus 101 of the information or the like stored in the scanner device 102. In the present embodiment, since WS-Eventing is used for the event signals transmitted from the scanner device 102, the network I/F 145 implements a corresponding Web Service protocol.

Pull Scan Process (Comparative Example)

A pull scan process performed by the OS 122 of the information processing apparatus 101 according to a comparative example will be described next with reference to FIG. 2. The user can perform the pull scan process by installing an appropriate scanner driver and performing scan process setting. Overall control of the processing described below is performed by the CPU 111. In FIG. 2, the steps including a user operation are shown in trapezoids.

When the pull scan process is commenced, in S201, the CPU 111 receives a selection of an appropriate dedicated scanner driver 126 to use and an installation instruction from the user. In S202, the CPU 111 installs the scanner driver in the OS 122 in accordance with the installation instruction from the user.

Next, in S203, the CPU 111 receives a user operation and searches for and selects a scanner device 102 using the functions of the OS 122. After that, in S204, the user goes to the selected scanner device 102 carrying an original, and places the original on the scan unit 141 of the scanner device 102.

Next, in S205, the user goes back to the information processing apparatus 101, opens an application 123 to invoke the dedicated scanner driver 126, and issues an instruction to execute scanning. The CPU 111 commences the scan process upon receiving the instruction to execute scanning from the user. After scanning, in S206, the user again goes to the scanner device 102 to remove the original and goes back to the information processing apparatus 101 to perform operations such as image processing using the image data captured in the application 123. When the user has finished working on the application 123, the CPU 111 ends the pull scan process.

Pseudo Push Scan Process (Comparative Example)

Figure 3:
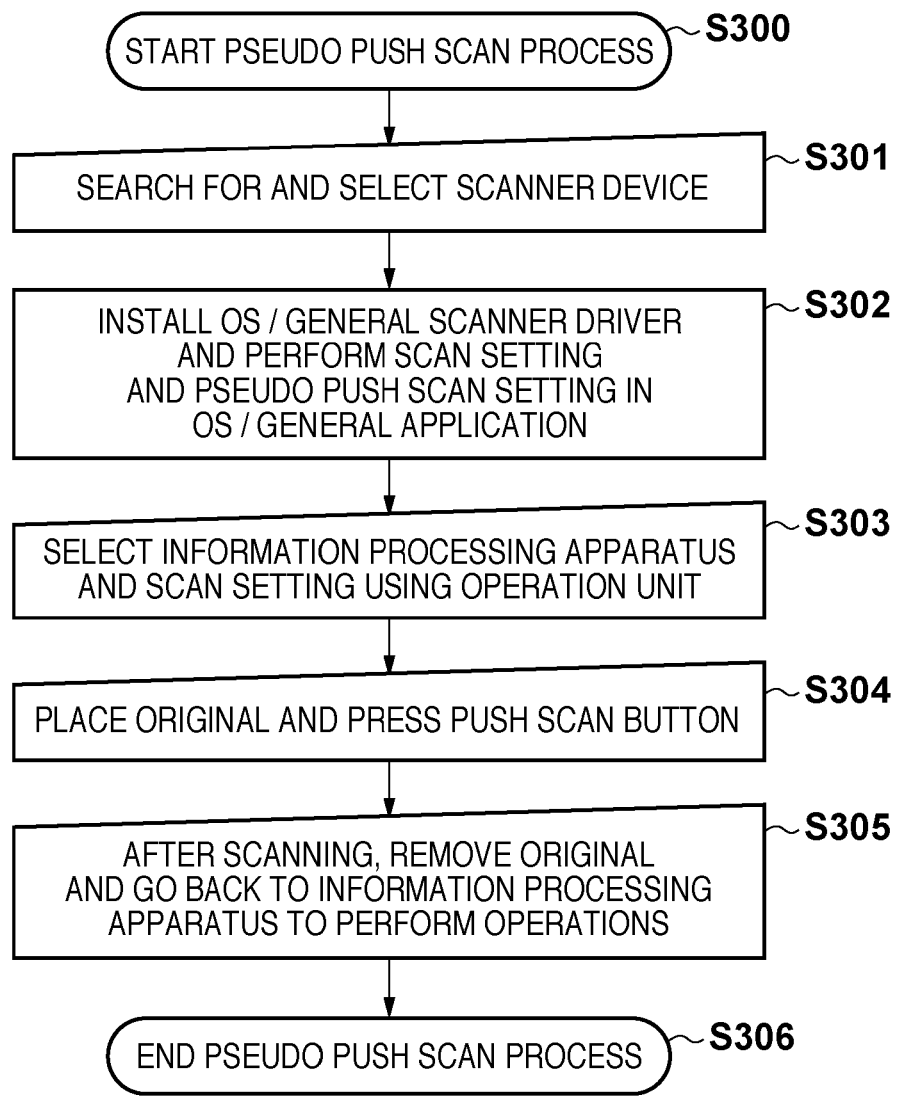
FIG. 3 is a flowchart illustrating a pseudo push scan process according to a comparative example.

A pseudo push scan process of the OS/general scanner driver 127 performed by the OS 122 of the information processing apparatus 101 according to a comparative example will be described next with reference to FIG. 3. The pseudo push scan process is an example of a specific scan mode according to the present embodiment. When the user selects a scanner device 102 as the scanner device he/she wants to use through the information processing apparatus 101, an OS/general scanner driver 127 is installed from an internal memory of the OS 122, the external memory 121, or another storage apparatus. The installed OS/general scanner driver 127 is activated by an application 123 and operated in the RAM 112 to perform the pseudo push scan process. Overall control of the processing described below is performed by the CPU 111. In FIG. 3, the steps including a user operation are shown in trapezoids.

When the pseudo push scan process is commenced, in S301, the CPU 111 receives a user operation, and searches for and selects a scanner device 102 to use. When a scanner device 102 has been selected, in S302, the CPU 111 installs the OS/general scanner driver 127 in the OS 122 from the internal memory, the external memory 121 or another storage apparatus. Furthermore, in S302, following the installation of the OS/general scanner driver 127, the CPU 111 also performs scan process setting and pseudo push scan process setting in the OS/general application 128.

Next, in S303, the user goes to the scanner device 102 carrying an original, and selects, using the operation unit 137, a scan data destination information processing apparatus 101. Here, the CPU 111 receives the information selected by a user operation, and if necessary, may update the scan settings. Then, in S304, the user places the original on the scan unit 141 of the scanner device 102 and issues an instruction to commence a pseudo push scan.

After scanning, in S305, the user removes the original from the scanner device 102, goes back to the information processing apparatus 101, and performs operations such as image processing using the image data captured in the OS/general application 128. When the user has finished working on the OS/general application 128, the CPU 111 ends the pseudo push scan process.

Conventional scan processes via a network have been described above, but the pull scan process and the pseudo push scan process shown in FIGS. 2 and 3 both have two problems. One is that the user has to go to the information processing apparatus 101 to perform setting operations S201 and S301. The other is that the user needs to move back and forth several times between the information processing apparatus 101 and the scanner device 102 to perform the setting operations.

Pseudo Push Scan Process (Present Embodiment)

Figure 4A:
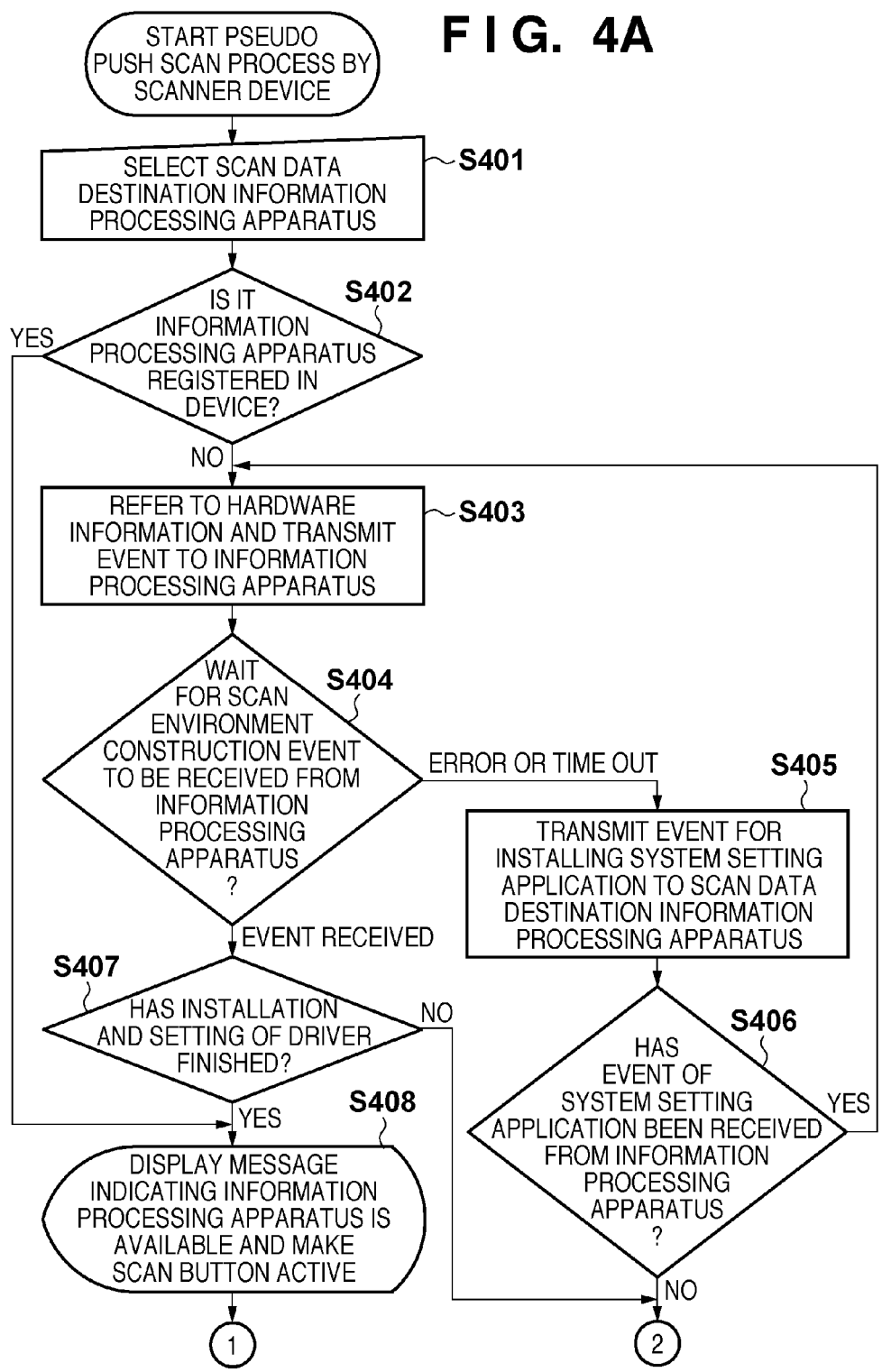
FIGS. 4A and 4B are flowcharts illustrating an example of a pseudo push scan process performed by the scanner device according to the embodiment of the present invention.
Figure 4B:
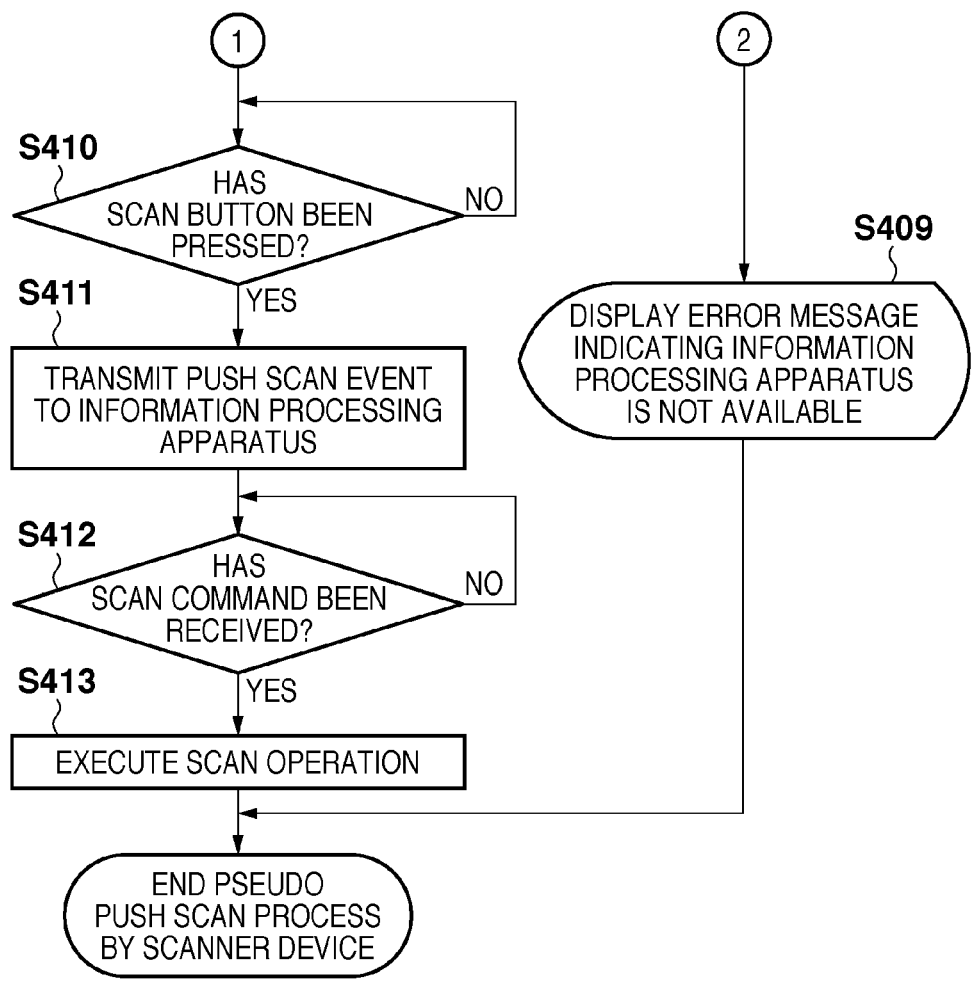

A pseudo push scan process performed by the scanner device 102 according to the present embodiment will be described next with reference to FIGS. 4A and 4B. Overall control of the processing described below is performed by the CPU 132. In FIGS. 4A and 4B, the steps including a user operation are shown in trapezoids.

When the pseudo push scan process by the scanner device 102 is commenced, the CPU 132 first receives a user operation via the operation unit 137, and selects a transmission destination information processing apparatus to which scan data is to be transmitted. Selection of the transmission destination information processing apparatus is performed by receiving input of information, such as the IP address or the name of the information processing apparatus, from the user. Then, in S402, the CPU 132 checks whether the selected information processing apparatus 101 has already been registered in the scanner device 102 as a scan data destination for pseudo push scan (specific scan mode) by searching the settings information (registered information) in the RAM 133 or the external memory 143.

If the selected information processing apparatus 101 has not been registered, the processing advances to S403, where the CPU 132 transmits a push mode event (first event) according to the WS-Eventing including hardware information as parameters to the selected information processing apparatus 101. The hardware information will be described later in detail with reference to FIG. 11. After that, in S404, the CPU 132 waits, for a predetermined period of time, for a scan environment construction event that is a response event to be received from the information processing apparatus 101 to which the push mode event was transmitted. The scan environment construction event will be described later in detail with reference to FIG. 15.

If the scan environment construction event is not received within the predetermined period of time or an error is received from the information processing apparatus 101, the CPU 132 determines that the system setting application is not running in the information processing apparatus 101, and the processing advances to S405. In this case, the subsequent operations are performed assuming that an information processing apparatus 101 that has not been used before has been selected. Specifically, in S405, the CPU 132 transmits, to the OS 122 of the information processing apparatus 101, an event (second event) to activate a process for installing the system setting application. Upon receiving the event, the information processing apparatus 101 commences the process for installing the system setting application in the OS 122 from a storage apparatus to which reference can be made such as the external memory 121 or the driver distribution server 103 and activating the system setting application in the RAM 112. The process for installing the system setting application performed by the information processing apparatus 101 in response to an instruction from the scanner device 102 in S405 will be described later with reference to FIG. 5.

Next, after the system setting application has been successfully installed in the OS 122 of the information processing apparatus 101 and is activated in the RAM 112, in S406, the CPU 132 determines whether or not a response event transmitted from the information processing apparatus 101 has been received. The response event includes the hardware information as parameters. If it is determined that the response event has been received, the processing returns to S403, where the CPU 132 again transmits an event including the hardware information as parameters to the selected information processing apparatus. If, on the other hand, it is determined in S406 that the response event has not been received, the processing advances to S409.

If it is determined in S404 that the scan environment construction event has been received, in S407, the CPU 132 determines, from the content of the event, whether or not a scan environment has been constructed. If it is determined that a scan environment has not been constructed, the processing advances to S409, where the CPU 132 displays, on the operation unit 137, a message indicating that the information processing apparatus is not available and prompts the user to execute scanning with another scanner device, and the processing ends.

If, on the other hand, it is determined that a scan environment has been constructed, the processing advances to S408, where the CPU 132 displays, on the operation unit 137, a message indicating that the information processing apparatus 101 is available, makes a scan button for execution of scanning active, and thereby prompts the user to execute scanning. After that, in S410, the CPU 132 waits for the scan button for executing scanning to be pressed by the user.

When the scan button has been pressed, in S411, the CPU 132 transmits a push scan event to the information processing apparatus 101. After that, in S412, the CPU 132 waits for a scan command to be transmitted from the information processing apparatus 101. If the scan command is received, the processing advances to S413, where a scan process by the scan unit 141 is executed, and the processing ends. After the message has been displayed in S409 and after the scan process has been executed in S413, the pseudo push scan process performed by the scanner device 102 ends.

Installation Process

The system setting application installation process performed by the information processing apparatus 101 will be described next with reference to FIG. 5. It is assumed here that the information processing apparatuses 101a and 101b have the same policy and settings in their OS 122. Specifically, two settings have been preset in the pseudo push scan system. One is a setting that enables a function of automatically installing the OS/general scanner driver. The other is a setting in which an updated version of OS standard scanner driver package including both the system setting application and the OS/general scanner driver used in the present embodiment is set up in the storage apparatus which each information processing apparatus can access. The updated version of OS standard scanner driver package is a package in which the system setting application has been set as a target application of Co-Installer that installs a related application at the same time when the installation setting file is updated. In the updated version of OS standard scanner driver package, the OS general scanner driver itself is not changed. Overall control of the processing described below is performed by the CPU 111.

First, in S501, the CPU 111 waits for an installation event to the OS 122 to be received from a specific scanner device. Upon receiving the installation event, in S502, the CPU 111 determines whether or not the installation event includes the ID of a device corresponding to the OS/general scanner driver. If it is determined that the installation event includes the ID of a device corresponding to the OS/general scanner driver, the processing advances to S503, where the CPU 111 commences installation of the OS/general scanner driver in the device. In the installation performed here, not only the OS standard scanner driver package stored in the OS 122, but also an updated OS standard scanner driver is searched for. The updated version of OS standard scanner driver package, which has been preset, is installed in the OS 122.

Next, in S504, the CPU 111 activates Co-Installer and at the same time installs the system setting application by copying the system setting application in the external memory 121. Then, in S505, the CPU 111 activates the installed system setting application 125 and loads the application into the RAM 112. Furthermore, the CPU 111 sets, in the network I/F 118, a port for receiving a push mode event according to WS-Eventing including the hardware information of the scanner device 102 as parameters. Here, the system setting application transmits a subscribe event to the scanner device 102. Through the above processing, the process for installing the system setting application and the OS/general scanner driver ends.

Examples of Screens

Figure 6:
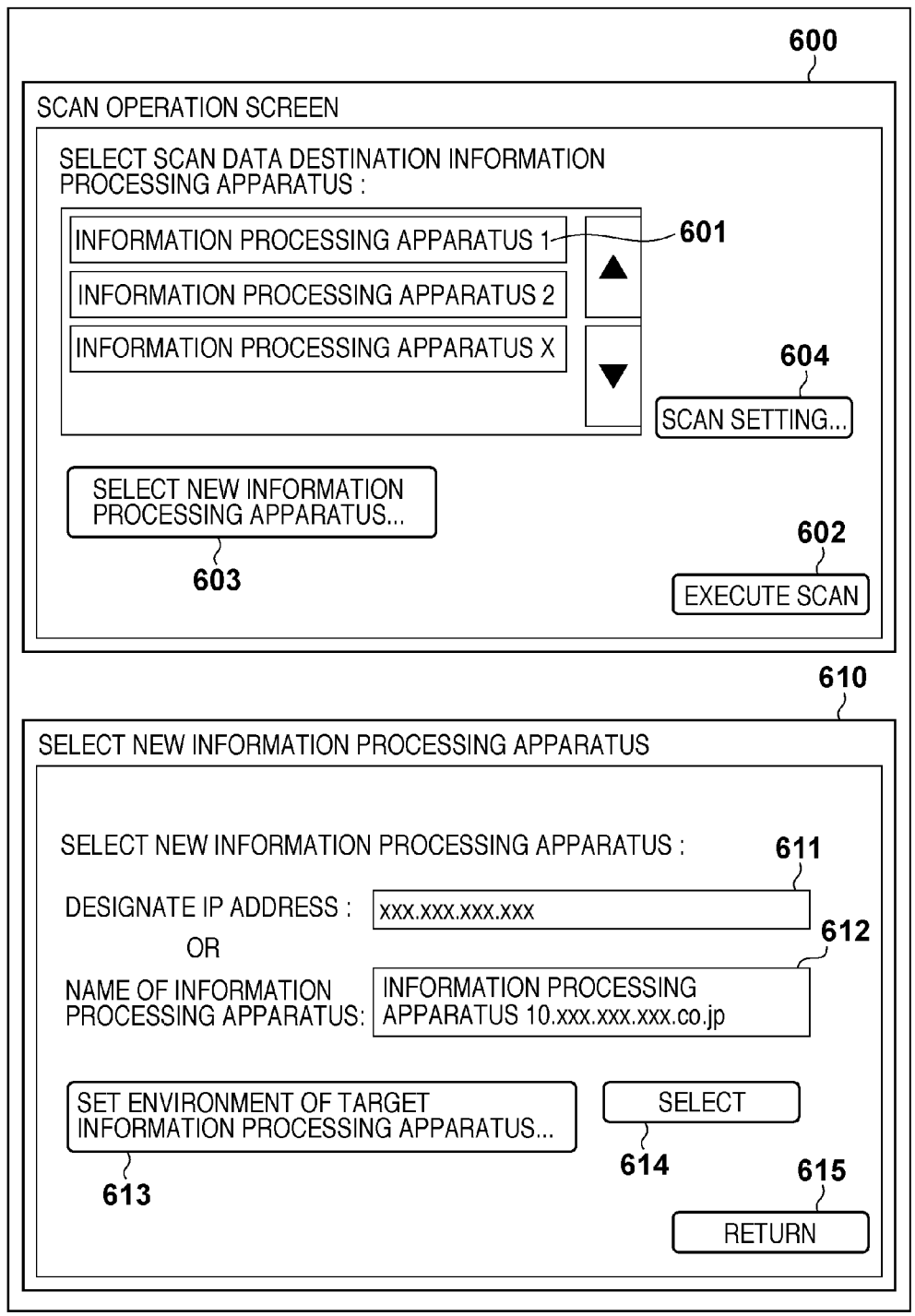
FIG. 6 is a diagram showing examples of screens displayed on the scanner device according to the embodiment of the present invention.

Examples of screens displayed on the operation unit 137 of the scanner device 102 will be described next with reference to FIGS. 6 to 8. FIG. 6 shows a user interface (screen) 600 of the operation unit 137. The screen 600 is displayed when the user selects a scan menu on the operation unit 137.

In a scan data destination list 601, a list of information processing apparatuses currently set as scan data destinations is displayed. When the user presses a scan execution button 602, the scanner device 102 executes a scan process such that the pseudo push scan is performed on the scan data destination information processing apparatus designated in the scan data destination list 601. In the screen 600, a button 603 for selecting a new scan data destination information processing apparatus is displayed as a setting specific to the present embodiment. By pressing the button 603, the user can select an information processing apparatus he/she has not used or set before, and a screen 610 for selecting a new information processing apparatus is displayed on the operation unit 137.

In the screen 610, when the user selects an information processing apparatus using an IP address setting box 611 or an information processing apparatus name setting box 612 and presses a select button 614, the pseudo push scan process shown in FIGS. 4A and 4B is commenced by the scanner device 102. If the user presses a button 613 for setting the environment of the scan data destination information processing apparatus before the select button 614 is pressed, a screen 700 for setting the environment of the scan data destination information processing apparatus, shown in FIG. 7, is displayed on the operation unit 137.

Figure 7:
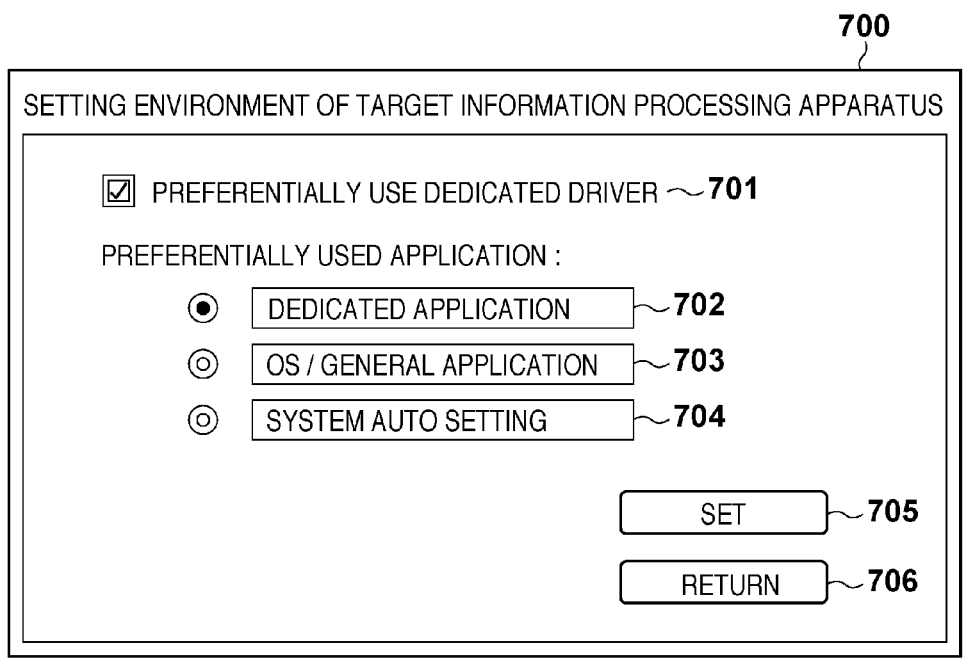
FIG. 7 is a diagram showing an example of a screen displayed on the scanner device according to the embodiment of the present invention.

FIG. 7 shows the screen 700 for setting the environment of the scan data destination information processing apparatus in which a pseudo push scan processing method that the user wants to perform on the scan data destination information processing apparatus is selected. The user can make a selection using a checkbox 701 for selecting whether to preferentially use the scanner driver dedicated to the scanner device 102 as the scanner driver, and radio buttons 702, 703 and 704 for selecting a scan application that should be preferentially used. When the user presses a set button 705, the display returns to the screen 610 for selecting a new information processing apparatus shown in FIG. 6, and the settings made in the screen 700 are reflected in the new scan data destination information processing apparatus. When a return button 706 is pressed, the display returns to the screen 610 without storing the changes.

Figure 8:
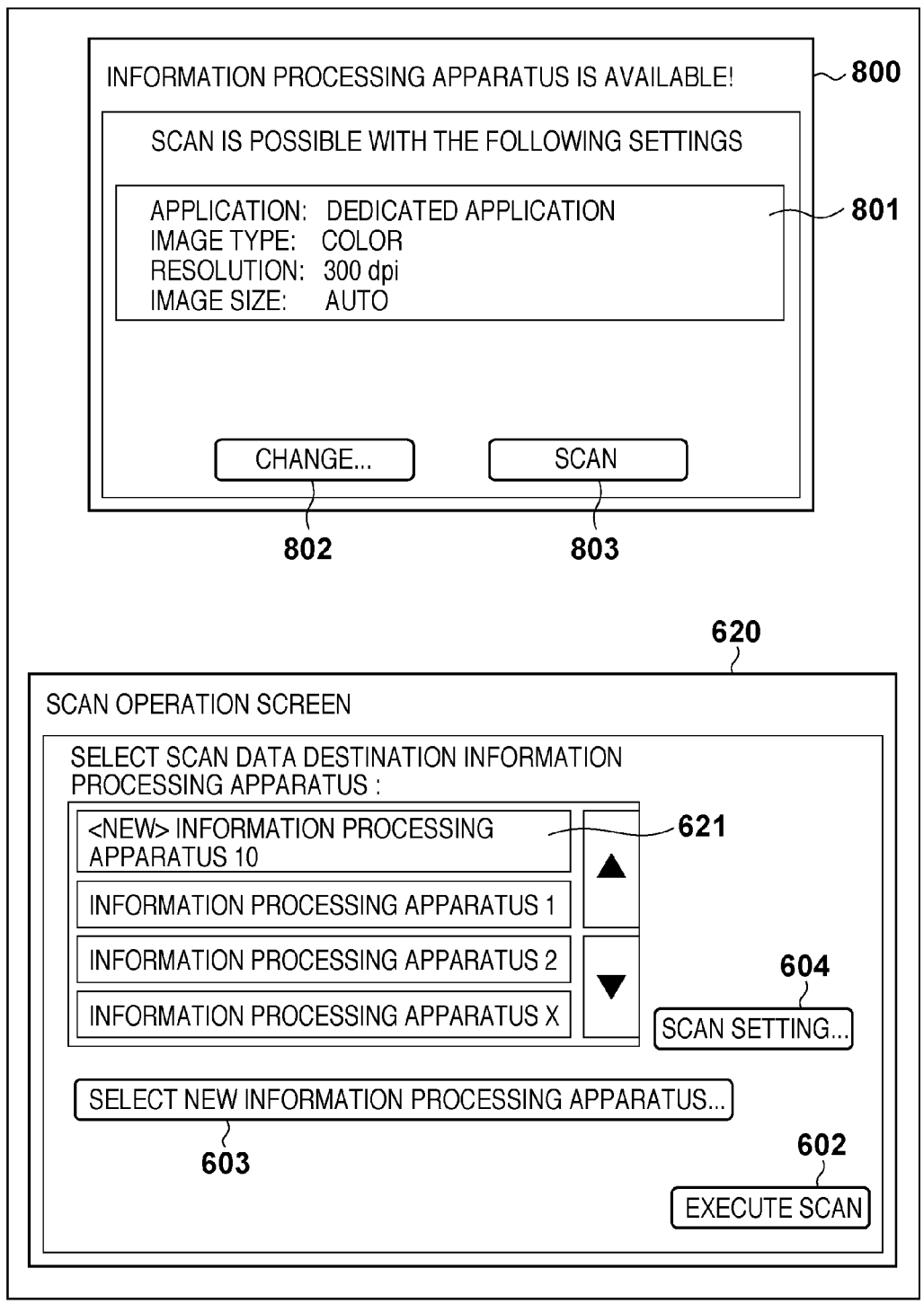
FIG. 8 is a diagram showing examples of screens displayed on the scanner device according to the embodiment of the present invention.

FIG. 8 shows a screen 800 indicating that the information processing apparatus is available, which is displayed when the select button 614 has been pressed in the screen 610 of FIG. 6 and the environment of the scan data destination information processing apparatus has been set. The screen 800 is an example of a screen displayed on the operation unit 137 when the pseudo push scan operation shown in FIGS. 4A and 4B is commenced by the scanner device 102 and the processing reaches step S408.

The main environment settings such as the name of application used, the image type, the resolution and the image size are displayed in 801. The settings can be changed to other settable values by the user pressing a change button 802. The scanner device 102 creates hardware information 144 in which the content of the changes made by the button 802 being pressed is reflected. After that, the processing in S403 shown in FIGS. 4A and 4B is again performed. As a result, the updated screen 800 indicating that the information processing apparatus is available is displayed on the operation unit 137. When the user presses a scan button 803 after checking the scan settings, the scanner device 102 commences the pseudo push scan process.

The pseudo push scan process is performed with the settings made in the screen 800. When the scan processing in S413 finishes, information regarding the new information processing apparatus and scan settings is stored in the RAM 133 by the scanner device 102, and the screen 600 is displayed. In this case, the scan process setting (information regarding the new information processing apparatus) that has just been set is added to and displayed in a scan data destination list 621 as shown in a screen 620 of FIG. 8.

Screen Transition

Figure 9:
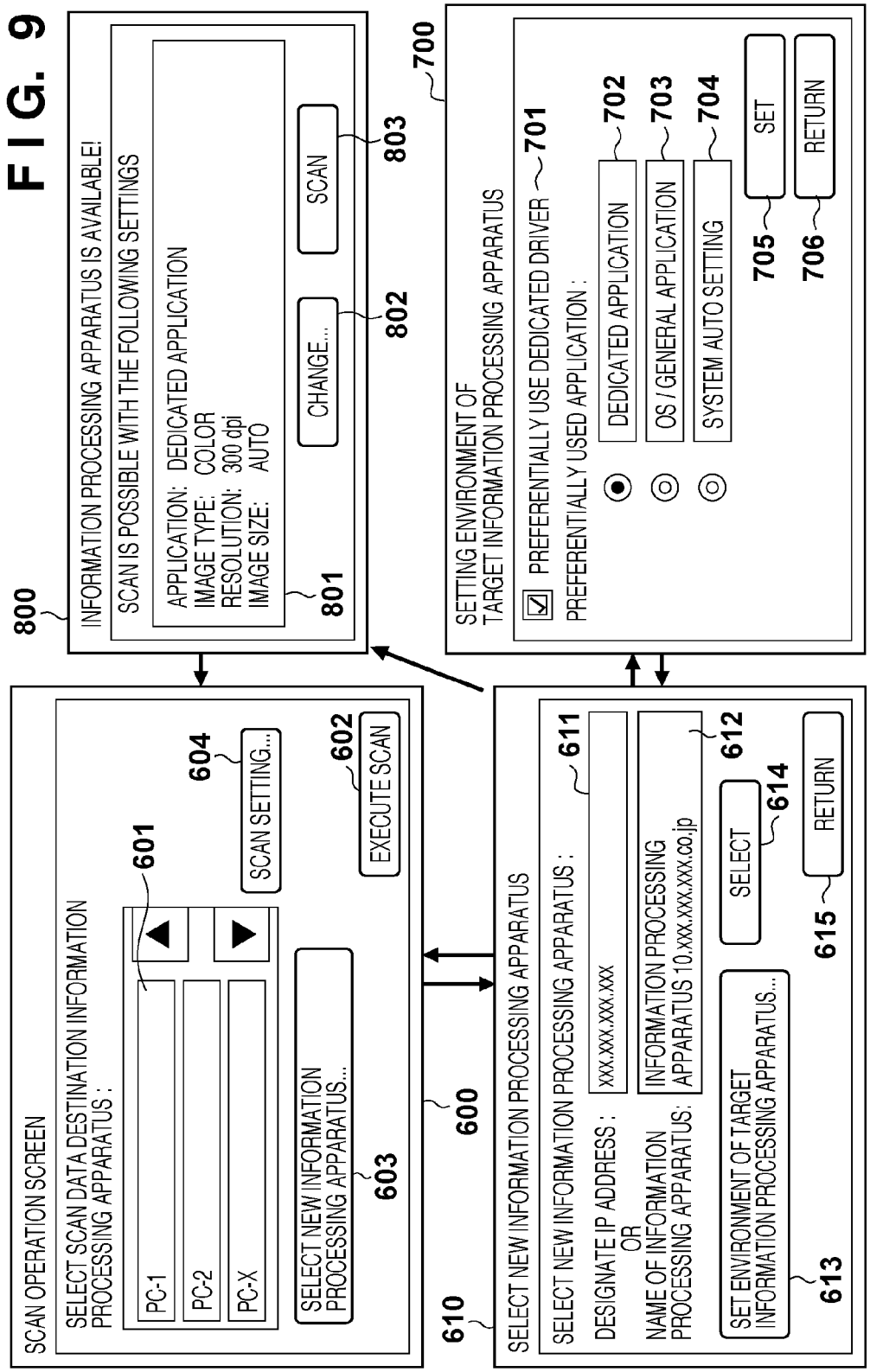
FIG. 9 is a diagram showing an example of transition of the screen displayed on the scanner device according to the embodiment of the present invention.

Transition of the screen on the operation unit 137 of the scanner device 102 will be described next with reference to FIG. 9. First, the operation unit 137 displays the destination designation screen 600. When the button 603 for selecting a new information processing apparatus has been pressed, the operation unit 137 displays the screen 610 for selecting a new information processing apparatus. In the screen 610 for selecting a new information processing apparatus, a setting can be made so as to transmit scan data to a completely new information processing apparatus. When a scan data destination information processing apparatus has been specified and the select button 614 has been pressed, the operation unit 137 executes the pseudo push scan environment construction process in the specified information processing apparatus, and displays the screen 800 indicating that the information processing apparatus is available.

In the screen 610 for selecting a new information processing apparatus, the button 613 for setting the environment of the scan data destination information processing apparatus is displayed. When the button 613 is pressed, the screen 700 for setting the environment of the scan data destination information processing apparatus is displayed. With the set button 705, the settings are reflected. With the return button 706, the settings are not reflected. In either case, the display is returned to the screen 610 for selecting a new information processing apparatus.

In the screen 800 indicating that the information processing apparatus is available, when a scan button 803 has been pressed, the pseudo push scan process is commenced, and at the same time, the destination designation screen 600 is displayed. When the pseudo push scan process has finished, the scan process setting that has just been set is added to and displayed in the scan data destination list 601 of the destination designation screen 600, and thus the settings can be designated again.

Scan Process

Figure 10:
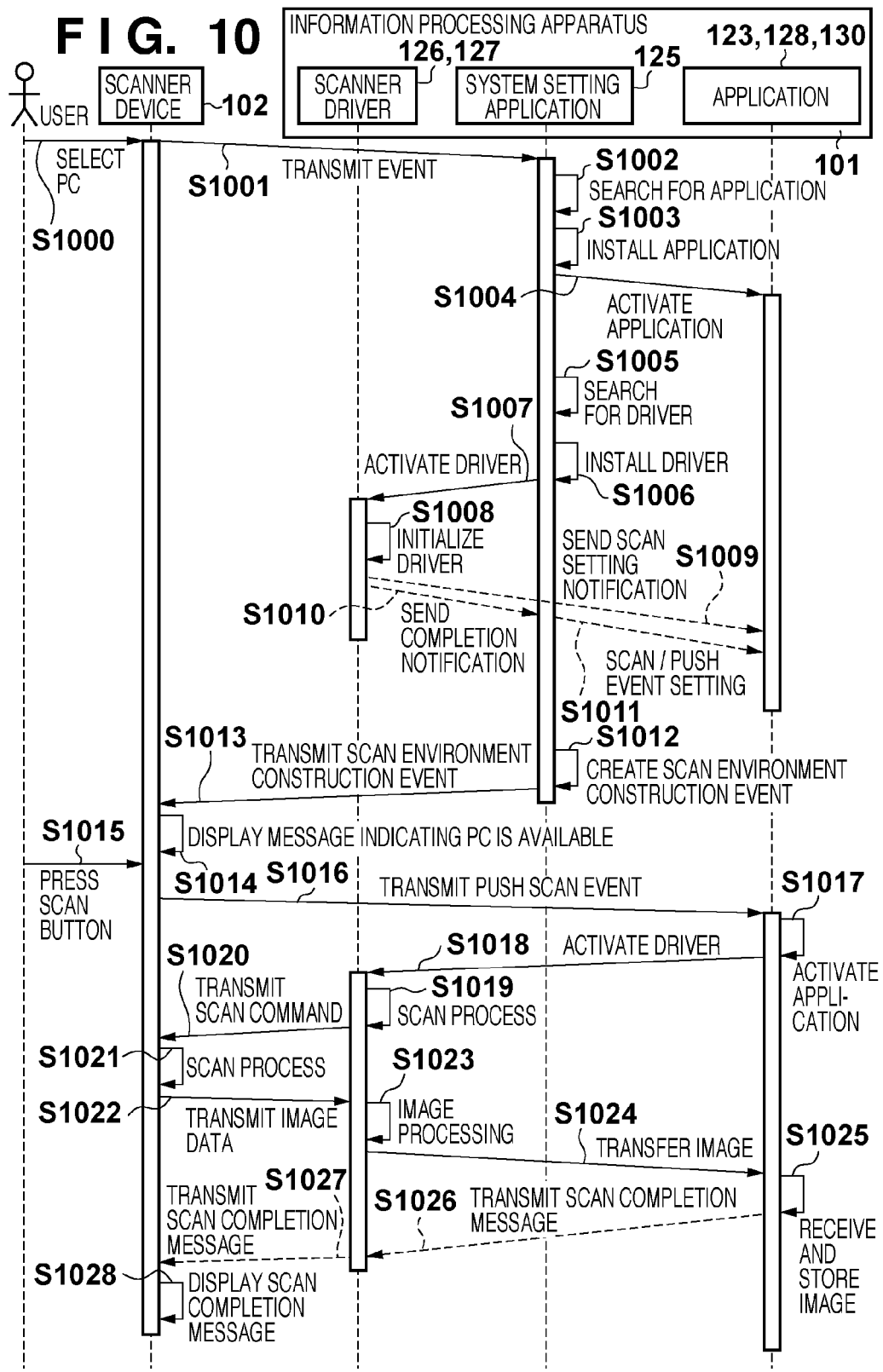
FIG. 10 is a sequence diagram showing the procedure of a scan process according to the embodiment of the present invention.

The procedure of a scan process will be described next with reference to FIG. 10. Here, how the system environment construction process is performed between related programs during a series of scan processing will also be described, assuming that the system setting application has already been installed in the scan data destination information processing apparatus 101 and is activated in the RAM 112.

First, in S1000, the user selects a scan data destination information processing apparatus via the screen 610 displayed on the operation unit 137 of the scanner device 102. Next, in S1001, the scanner device 102 transmits, to the scan data destination information processing apparatus, a push mode event according to WS-Eventing including the hardware information 144 as parameters. Then, in S1002, the system setting application 125 activated in the RAM 112 of the scan data destination information processing apparatus 101 makes a query to the OS 122, and searches for an application capable of push scan that has been installed. The system setting application 125 is a program that starts running when an event is transmitted from a scanner device 102, and performs specific processing such as construction of a pseudo push scan environment and management of general and dedicated scanner drivers, which will be described later.

Next, the system setting application 125 selects an appropriate application 123, 128 or 130 and if necessary, installs the selected application in S1003, and activates the application in S1004. Then, in S1005, the system setting application 125 searches for an appropriate scanner driver, and if necessary, installs a selected scanner driver 126 or 127 in S1006, and activates the driver in S1007. The activated dedicated scanner driver 126 or OS/general scanner driver 127 initializes itself in S1008, and if necessary, notifies the application 123, 128 or 130 of the scan settings in S1009.

Next, in S1010, the scanner driver sends the completion notification to the system setting application 125. Then, in S1011, the system setting application 125 performs scan setting and push event setting in accordance with the hardware information 129 on one of the applications 123, 128 and 130. Through this processing, a pseudo push scan environment is constructed. After that, the system setting application 125 creates a scan environment construction event using resultant information regarding the constructed environment in S1012, and transmits the scan environment construction event to the scanner device 102 in S1013, and the processing ends.

Upon receiving the scan environment construction event, in S1014, the scanner device 102 displays the screen 800 on the operation unit 137. After that, in S1015, the user checks the display, places the original and presses the scan button 803. When the scan button 803 has been pressed, in S1016, the scanner device 102 transmits a push scan event to the scan data destination information processing apparatus. In the information processing apparatus 101, optionally through the dedicated scanner driver 126 or the OS/general scanner driver 127, the transmitted push scan event is transmitted to the application via the OS 122. The application that has received the push scan event is activated to commence the scan process in S1017, and the dedicated scanner driver 126 or the OS/general scanner driver 127 is activated in S1018.

The dedicated scanner driver 126 or the OS/general scanner driver 127 commences the scan process in response to an instruction from one of the applications 123, 128 and 130 in S1019, and transmits a scan command to the scanner device 102 in S1020. The scanner device 102 commences the scan process in S1021, and transfers read image data to the dedicated scanner driver 126 or the OS/general scanner driver 127 in S1022. The dedicated scanner driver 126 or the OS/general scanner driver 127 instructs one of the applications 123, 128 and 130 to perform image processing on the received image data in S1023, and transfers the image data to the application in S1024.

In S1025, one of the applications 123, 128 and 130 temporarily stores the received image data in the external memory 121 or loads the received image data into the RAM 112, and waits until the user arrives at the scan data destination information processing apparatus. Then, in S1026, one of the applications 123, 128 and 130 transmits a message indicating that the scan process has finished to the dedicated scanner driver 126 or the OS/general scanner driver 127. In S1027, the dedicated scanner driver 126 or the OS/general scanner driver 127 transmits a message indicating that the scan process has finished to the scanner device 102. After that, in S1028, the scanner device 102 displays a message indicating that the scan process has finished on the operation unit 137.

Hardware Information

An example of hardware information according to the present embodiment will be described next with reference to FIG. 11. The hardware information 144 is a collection of information necessary for the system setting application 125 to construct a pseudo push scan environment in the information processing apparatus 101. The hardware information 144 is generated by dynamically adding information obtained as a result of operation of the operation unit 137 by the user to the data statically stored in the external memory 143 or the like of the scanner device 102. The generated hardware information 144 is attached to an event to be transmitted to the scan data destination information processing apparatus 101 and transmitted to the information processing apparatus 101 by the scanner device 102.

As shown in FIG. 11, the hardware information 144 includes, for example, hardware IDs, a MAC address, an IP address, protocols, a recommended application and scan settings information. The hardware IDs and MAC address are values specific to the scanner device 102 and statically stored in the ROM 134. The IP address is a value set in the environment of the LAN 104 to which the scanner device 102 is connected, and is stored in the external memory 143.

Protocol #1 and Protocol #2 are the names of scanner protocols used by the scanner device 102 to perform operations, and are handled by the system setting application 125 running in the RAM 112 of the scan data destination information processing apparatus 101. If a plurality of scanner protocols are supported, Protocol #1 is preferentially used. The priority order according to which the protocols are to be used can be changed by a user operation. For example, the selection of the checkbox 701 for selecting whether or not to preferentially use the dedicated scanner driver shown in FIG. 7 is reflected. When the checkbox 701 is checked, for example, the name of a scanner protocol of the hardware information 144 is changed such that the value of Protocol #1 indicates the dedicated driver named Vendor Network Protocol.

The recommended application designates an application used in the pseudo push scan. The setting can be changed by, for example, a user operation, and the selection of one of the radio buttons 702, 703 and 704 for selecting a preferentially used application shown in FIG. 7 is reflected. The recommended application may be set so as to allow an application other than the recommended application to be operated depending on the settings of the information processing apparatus 101. Scan settings information stores settings requested by the user in the form of a list. As for the settings, for example, the scan settings displayed by the scan setting button 604 of FIG. 6 being pressed are reflected.

Pseudo Push Scan Setting Process

Figure 12:
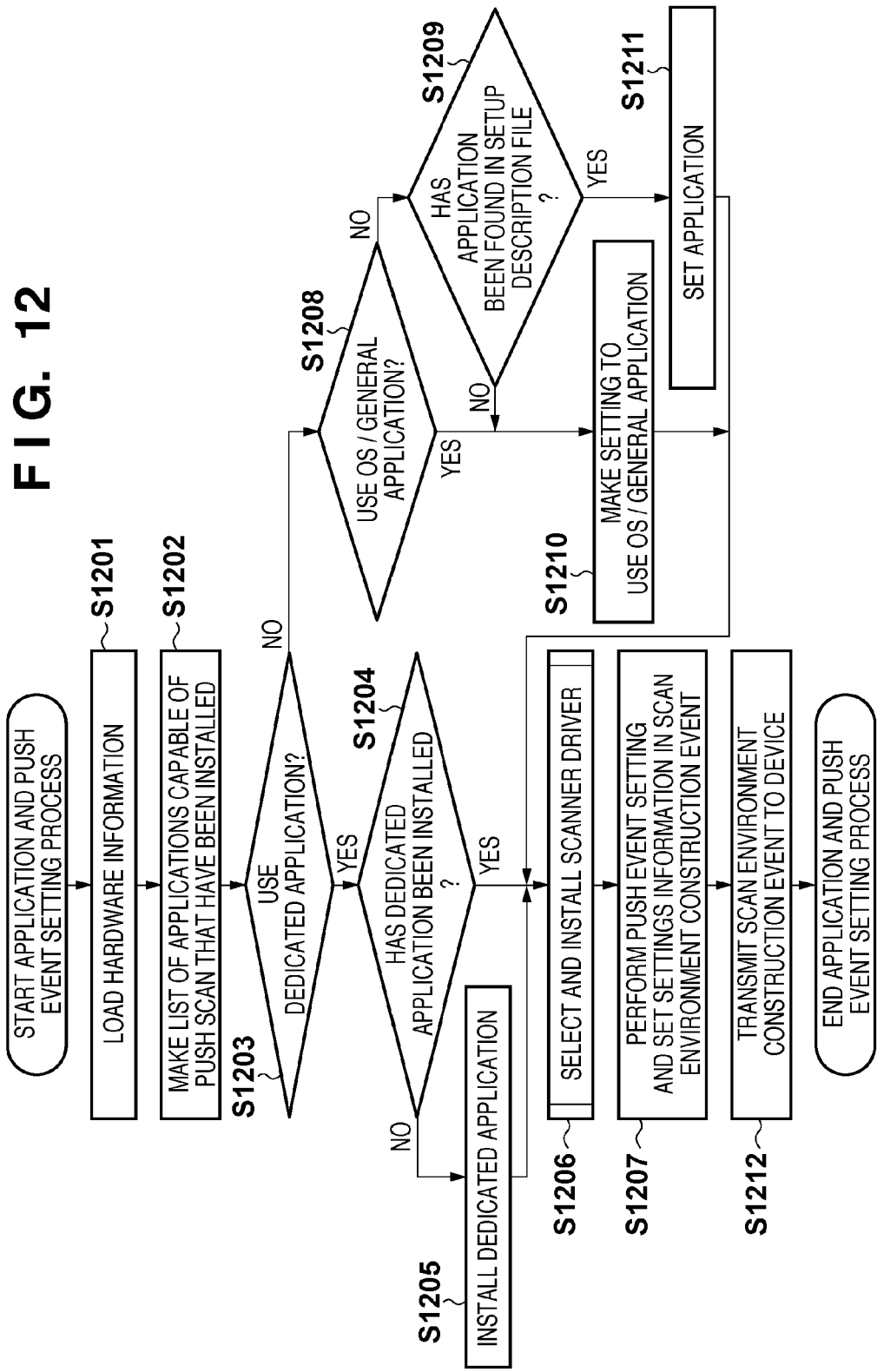
FIG. 12 is a flowchart illustrating a pseudo push scan setting process according to the embodiment of the present invention.

The process for setting an application and a push event specific to the present embodiment performed by the system setting application 125 will be described next with reference to FIG. 12. The processing described below is commenced by the system setting application 125 receiving an event including the hardware information 144.

First, in S1201, the system setting application 125 loads the received hardware information 144 into the RAM 112. Then, in S1202, the system setting application 125 makes a query to the OS 122 to make a list of applications capable of push scan that have been installed. Furthermore, in S1203, the system setting application 125 refers to the recommended application column of the hardware information 144, and determines whether or not to use the dedicated application. If it is determined that the dedicated application will be used, the processing advances to S1204. If it is determined that the dedicated application will not be used, the processing advances to S1208.

In S1204, the system setting application 125 determines whether or not the dedicated application has been installed. If it is determined that the dedicated application has been installed, the processing advances to S1206. If, on the other hand, it is determined that the dedicated application has not been installed, the processing advances to S1205, where the system setting application 125 installs the dedicated application 130 by invoking an installation program from the external memory 121 or a storage apparatus to which reference can be made, and the processing advances to S1206. In S1206, the system setting application 125 selects and installs a scanner driver. The processing in S1206 will be described later in detail with reference to FIG. 13.

Next, in S1207, the system setting application 125 performs push event setting to the dedicated application 130 in the OS 122, and sets settings information in the scan environment construction event. After that, in S1212, the system setting application 125 transmits the scan environment construction event to the scanner device 102, and the processing ends.

If, on the other hand, it is determined in S1203 that the dedicated application will not be used, in S1208, the system setting application 125 refers to the hardware information 144 and determines whether or not to use the OS/general application. If it is determined that the OS/general application will be used, the processing advances to S1210, where the system setting application 125 sets the OS 122 to use the OS/general application 128. If, on the other hand, it is determined in S1208 that another application will be used, the processing advances to S1209, where the system setting application 125 checks the applications written in the setup description file of the scanner driver. If a target application is not found in S1209, the processing advances to S1210, where the system setting application 125 sets the OS 122 to use the OS/general application 128. If a target application is found, the processing advances to S1211, where the system setting application 125 sets the OS 122 to use the application. When either application has been set in S1210 or S1211, the processing advances to S1206, and the same processing as that performed when the dedicated application is used is performed.

Installation of Scanner Driver

Figure 13:
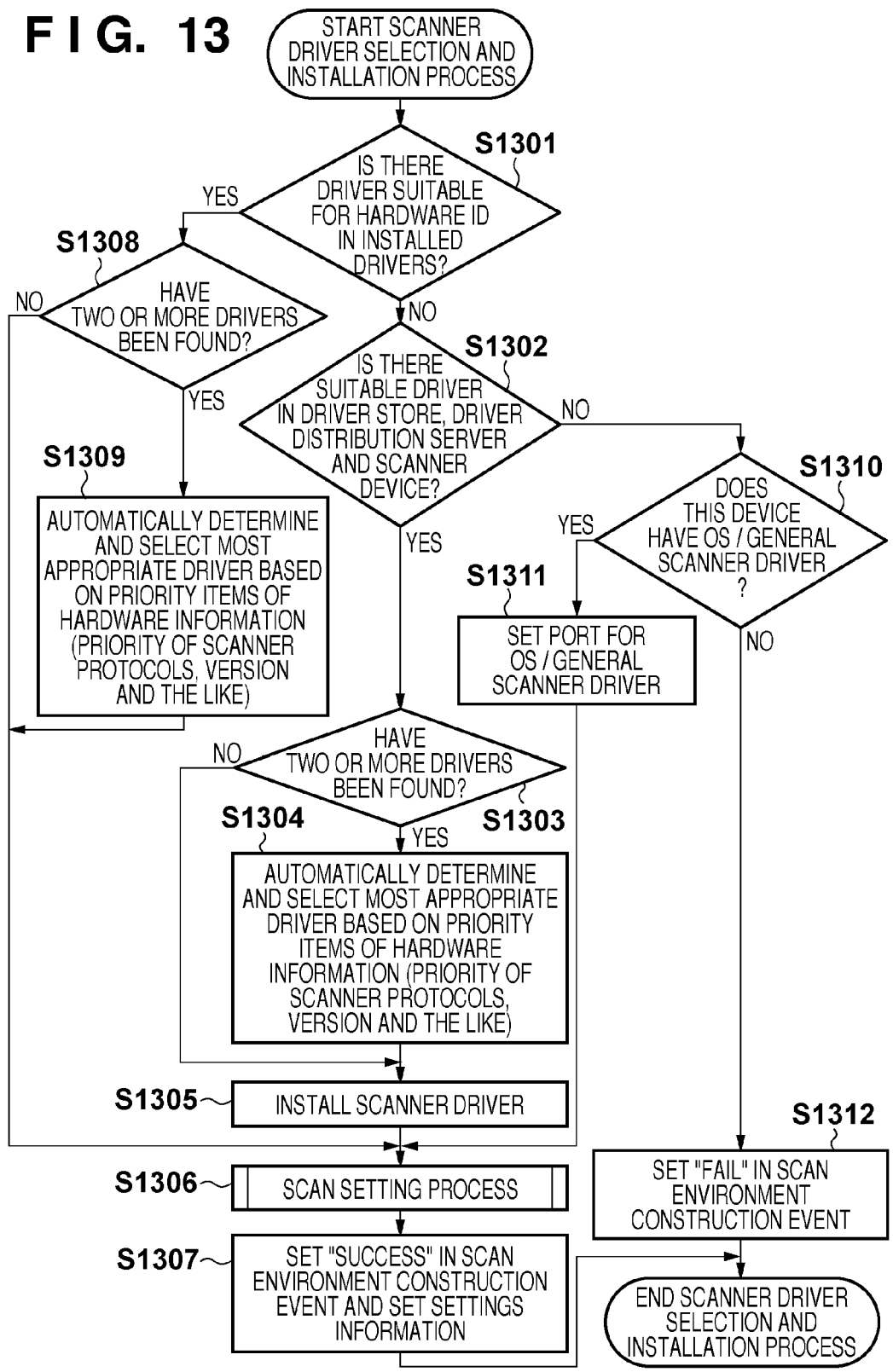
FIG. 13 is a flowchart illustrating a scanner driver installation process according to the embodiment of the present invention.

The process for selecting and installing a scanner driver specific to the present embodiment performed by the system setting application 125 will be described next with reference to FIG. 13. The following will describe details of the processing in S1206 shown in FIG. 12.

First, in S1301, the system setting application 125 determines whether or not there is a driver suitable for the hardware ID in the drivers that have been installed in the OS 122. Specifically, the system setting application 125 compares the hardware information 144 of the scanner device 102 acquired in S1201 with the hardware information 129 of each scanner driver registered in the OS 122, and acquires all the drivers having hardware information matching that of the scanner device 102. In the present embodiment, as the hardware information, hardware IDs used for plug and play installation are acquired. If there is a suitable driver, the processing advances to S1308. If there is no suitable driver, the processing advances to S1302.

In S1302, the system setting application 125 determines whether or not there is a suitable scanner driver in a driver store, the driver distribution server 103 and the external memory 143 of the scanner device 102. If it is determined that there is a suitable driver, the processing advances to S1303. If it is determined that there is no suitable driver, the processing advances to S1310. The driver store mentioned above is a database system of device drivers introduced in Windows Vista®, and is a system that stores device driver packages in the OS 122 that have not been installed. The system setting application 125 can make a query to the OS 122 as to whether there is a scanner driver having hardware information matching that of the scanner device 102 acquired in S1201 in the scanner drivers stored in the driver store. Furthermore, the system setting application 125 can make a query to the driver distribution server 103 as to whether there is a scanner driver suitable for particular hardware information via the LAN 104 using an RPC (Remote Procedure Call), HTTP (Hyper Text Transfer Protocol) or the like. Also, the system setting application 125 searches in the scanner device 102, and determines whether there is a suitable driver. The scanner device 102 can store, in its external memory 143, a dedicated scanner driver that is necessary to use the scanner device itself. The system setting application 125 can also make a query regarding the scanner driver stored in the scanner device 102 via the LAN 104 in the same manner as when it makes a query to the driver distribution server 103. As a result of the query, if there is at least one suitable driver, a package including the scanner driver is transferred from the driver distribution server 103 or the like to the information processing apparatus 101, and stored in the external memory 121.

If it is determined in S1302 that a suitable scanner driver has been found, the system setting application 125 determines in S1303 whether or not a plurality of scanner drivers have been found. If it is determined that a plurality of suitable scanner drivers have been found, the processing advances to S1304. If it is determined that only one suitable scanner driver has been found, the processing advances to S1305. In S1304, the system setting application 125 selects the most appropriate scanner driver from among the scanner devices. In the present embodiment, a driver to be installed is automatically selected based on the priority, the name of scanner protocol and the version information and the like of the hardware information loaded into the RAM 112 in S1201. For example, a version number is assigned to each scanner driver, and even the scanner drivers for the same device model usually have different version numbers if they are created at different times. Version numbers are expressed by, for example, a combination of date and numerical values such as 10/10/2009.2.6.1.0, from which it can be easily seen that which one is new.

Using such information, the system setting application 125 selects a driver to be installed. After that, in S1305, the system setting application 125 installs the selected scanner driver in the OS 122, and the processing advances to S1306.

The processing in S1308 and S1309 is processing regarding a special case of the processing from S1303 to S1305. In other words, they are steps performed when a suitable scanner driver is found in the installed scanner drivers, and the processing in S1308 is the same as that in S1303, and the processing in S1309 is the same as that in S1304. S1305 is omitted because a scanner driver has already been installed.

The processing from S1310 to S1312 is performed when a suitable scanner driver was not found as a result of the series of processing in S1301 and S1302, and a port is created for the OS/general scanner driver (general driver) that was installed in S1006. First, in S1310, the system setting application 125 acquires protocol information from the hardware information loaded into the RAM 112 in S1201, and determines whether or not the general scanner driver supports the protocol. If the general scanner driver supports the protocol, the processing advances to S1311. Otherwise, the processing advances to S1312. In S1311, the system setting application 125 sets a general port corresponding to the scanner device 102 in the OS 122, and the processing advances to S1306. On the other hand, in S1312, because the corresponding scanner driver was not found, the system setting application 125 sets "fail" in the installation result of the scan environment construction event, and the processing ends.

Finally, in S1306, the system setting application 125 acquires scan settings information from the hardware information loaded into the RAM 112 in S1201, and makes the scan settings in the target application. The process for setting scan settings will be described later in detail with reference to FIG. 14. Then, in S1307, the system setting application 125 sets "success" in the installation result of the scan environment construction event as well as other settings information, and the processing ends.

Scan Setting Process

Figure 14:
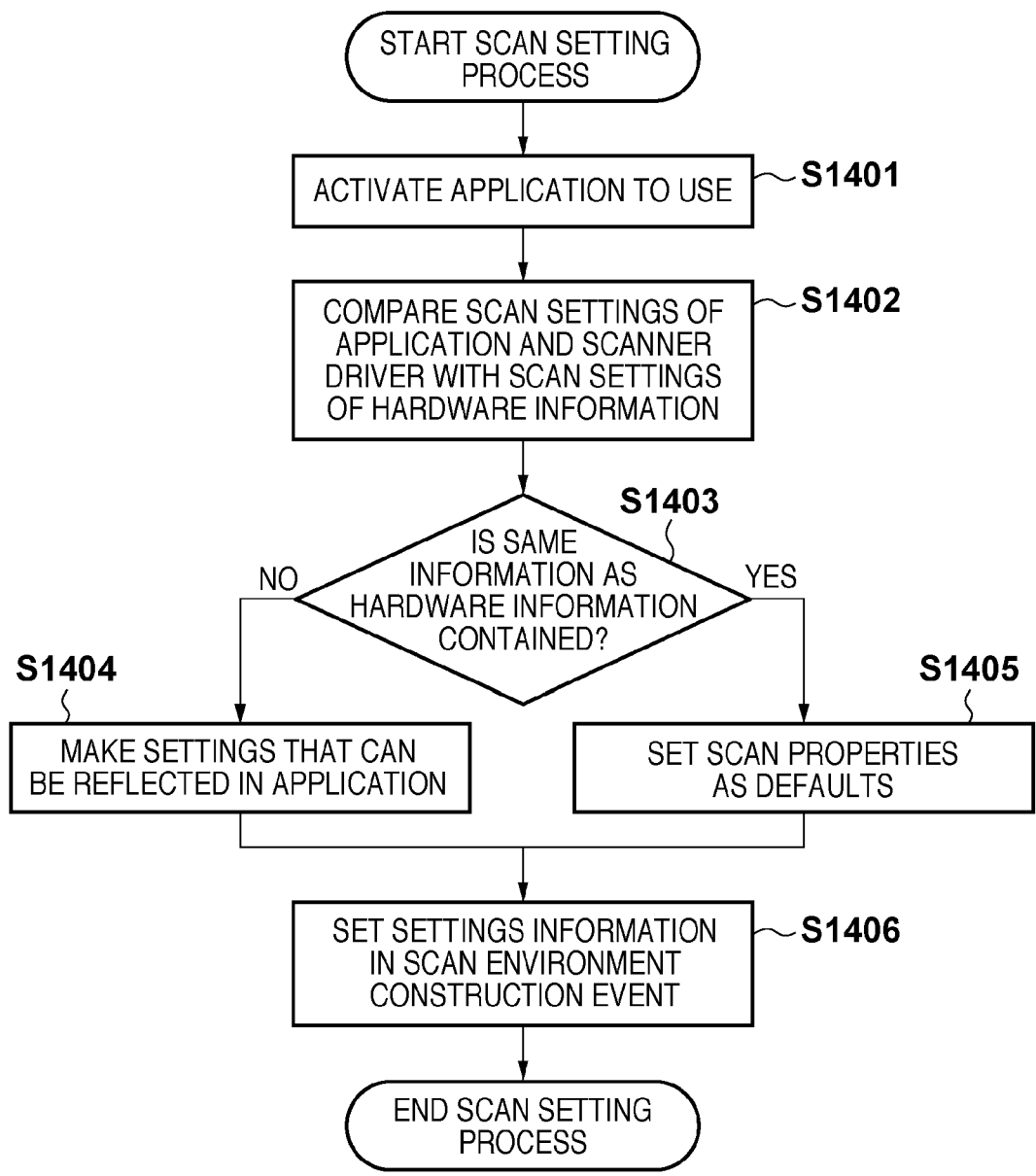
FIG. 14 is a flowchart illustrating a process for setting scan settings according to the embodiment of the present invention.

The process for setting scan settings specific to the present embodiment performed by the system setting application 125 will be described next with reference to FIG. 14. The following will describe details of the processing in S1306 shown in FIG. 13.

First, in S1401, the system setting application 125 activates an application to use from the external memory 121. Then, in S1402, the system setting application 125 compares the scan information acquired from the application and the scanner driver and the scan settings information obtained from the hardware information loaded into the RAM 112 in S1201. There are cases where the scan settings may be acquired as the configuration profile of the OS 122 or reflected as the configuration file of the scanner driver. With the dedicated application specific to the present embodiment, the system setting application 125 can freely refer to and make scan settings.

Next, in S1403, the system setting application 125 determines, from the comparison performed in S1402, whether or not the same information as the hardware information is contained. If information that is different from the hardware information is contained, the processing advances to S1404, where the system setting application 125 make scan settings that can be reflected in the application, and the processing advances to S1406. If, on the other hand, the same information as the hardware information is contained, the processing advances to S1405, where the system setting application 125 sets the scan settings as defaults, and the processing advances to S1406. Finally, in S1406, the system setting application 125 sets the final scan settings information of the application in the scan setting result of the scan environment construction event, and the process for setting scan settings ends.

Scan Environment Construction Event

An example of information of a scan environment construction event according to the present embodiment will be described next with reference to FIG. 15. The scan environment construction event of the present embodiment can be a message written in XML-SOAP. The information obtained as a result of construction of a pseudo push scan environment in the information processing apparatus 101 by the system setting application 125 is reflected as the values shown in FIG. 15, and dynamically stored in the RAM 112 or the like of the information processing apparatus 101.

The system setting application 125 sets the information shown in FIG. 15 in a SOAP message portion of the scan environment construction event transmitted to the scanner device 102. The installation result is set by the system setting application 125 in S1307 or S1312. In the scanner driver name, the driver version and the scanner driver date, the results of the process of selecting and installing a scanner driver shown in FIG. 13 are reflected. In the registered application, the result of the process for setting an application and a push event shown in FIG. 12 is reflected. In the scan setting result, the results of the process for setting scan settings shown in FIG. 14 are reflected.

When the scanner device 102 receives the scan environment construction event, the result of the pseudo push scan environment setting is displayed on the display of the operation unit 137. For example, when the environment of the scan data destination information processing apparatus has been set, the screen 800 shown in FIG. 8 is displayed. The values displayed in 801 such as the name of application used, the image type, the resolution and the image size are values obtained from the information of the scan environment construction event.

As described above, according to the present invention, the system setting application running on an information processing apparatus selected as the scan data destination automatically installs an optimal scanner driver and application and sets a pseudo push scan environment. With this configuration, the cumbersome operation of setting the scan environment performed in advance on the information processing apparatus side is not required, and therefore even with an information processing apparatus that the user uses for the first time, the user can use the pseudo push scan function by directly going to the scanner device without having to go to the information processing apparatus in the first place.

Other Embodiments

The above embodiment uses protocols defined by WS-Eventing to transmit notifications, such as events, between the information processing apparatus and the scanner device. However, the present invention is not limited thereto, and can be implemented by using, for example, GENA (General Event Notification Architecture) or the like. Also, the present invention is operable with any protocol as long as the hardware information can be appropriately conveyed to the system setting application running on the information processing apparatus and similar results can be obtained. As just described, the present invention is not limited to the above embodiment, and various modifications can be made. Also, in the above embodiment, as a method for installing the system setting application, installation of an OS/general scanner driver corresponding to the found network scanner device is used. However, the present invention is also operable by using a method in which a network service, a network application or the like is automatically installed in the information processing apparatus 101.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183388 filed on Aug. 18, 2010, which is hereby incorporated by reference herein in its entirety.

The invention claimed is:

1. An image reading system in which a plurality of information processing apparatuses and an image reading apparatus capable of executing a specific scan mode are connected, the image reading apparatus comprising:
- a transmission destination selection unit that selects a transmission destination information processing apparatus to which image data read from an original is to be transmitted;
- a transmission unit that refers to registered information registered in advance in a memory and, when the selected transmission destination information processing apparatus has not been registered as an information processing apparatus for executing the specific scan mode, transmits identification information for identifying the image reading apparatus,
- wherein the identification information includes at least information indicating a plurality of protocols for performing communication between the transmission destination information processing apparatus and the image reading apparatus and information indicating a priority order according to which the plurality of protocols are to be used; and
- a display control unit that displays a screen for receiving a scan execution instruction on a display when a notification indicating that the transmission destination information processing apparatus is available as the information processing apparatus for executing the specific scan mode has been received, and each information processing apparatus comprising:
- an installation unit that installs driver software corresponding to the image reading apparatus identified by the identification information when the identification information transmitted by the transmission unit has been received,
- wherein the installation unit comprises a search unit that searches a storage unit provided in the information processing apparatus or an external storage unit connected to the information processing apparatus, for the driver software corresponding to the image reading apparatus, and the installation unit installs the driver software found by the search unit, and
- wherein the installation unit further comprises a driver selecting unit that, when a plurality of driver software items have been found by the search unit, selects a driver software item to install from among the plurality of driver software items according to the priority order; and
- a notification unit that, when the driver software has been installed by the installation unit, sends, to the image reading apparatus, a notification indicating that the transmission destination information processing apparatus is available as the information processing apparatus for executing the specific scan mode.

2. The image reading system according to claim 1, wherein, when the driver software has not been found by the search unit, the installation unit uses general driver software that runs on an operating system of the transmission destination information processing apparatus.

3. An image reading apparatus that is connected to a plurality of information processing apparatuses and capable of executing a specific scan mode, the image reading apparatus comprising:
- a transmission destination selection unit that selects a transmission destination information processing apparatus to which image data read from an original is to be transmitted;
- a transmission unit that refers to registered information registered in advance in a memory and, when the selected transmission destination information processing apparatus has not been registered as an information processing apparatus for executing the specific scan mode, transmits identification information for identifying the image reading apparatus,
- wherein the identification information includes at least information indicating a plurality of protocols for performing communication between the transmission destination information processing apparatus and the image reading apparatus and information indicating a priority order according to which the plurality of protocols are to be used; and
- a display control unit that displays a screen for receiving a scan execution instruction on a display when a notification indicating that the transmission destination information processing apparatus is available as the information processing apparatus for executing the specific scan mode has been received,
- wherein each information processing apparatus comprises:
  - an installation unit that installs driver software corresponding to the image reading apparatus identified by the identification information when the identification information transmitted by the transmission unit has been received,
  - wherein the installation unit comprises a search unit that searches a storage unit provided in the information processing apparatus or an external storage unit connected to the information processing apparatus, for the driver software corresponding to the image reading apparatus, and the installation unit installs the driver software found by the search unit, and
  - wherein the installation unit further comprises a driver selecting unit that, when a plurality of driver software items have been found by the search unit, selects a driver software item to install from among the plurality of driver software items according to the priority order.

4. An image reading apparatus comprising:
- a selection unit that selects an information processing apparatus to which image data read from an original is to be transmitted;
- a transmission unit that transmits identification information for identifying the image reading apparatus to the information processing apparatus selected by the selection unit,
- wherein the identification information includes at least information indicating a plurality of protocols for performing communication between the information processing apparatus and the image reading apparatus and information indicating a priority order according to which the plurality of protocols are to be used;
- a receiving unit that receives, from the information processing apparatus, a notification indicating that driver software corresponding to the image reading apparatus is installed to the information processing apparatus based on the identification information;
- an instruction transmission unit that enables reception of a read start instruction from a user upon receiving the notification by the receiving unit, and transmits a transmission instruction of a read start request to the information processing apparatus upon receiving the read start instruction from the user; and a control unit that executes the read processing of the original, and transmits generated image data to the information processing apparatus upon receiving the read start request transmitted from the information processing apparatus in response to the transmission instruction by the instruction transmission unit, the information processing apparatus comprising:
an installation unit that installs driver software corresponding to the image reading apparatus identified by the identification information when the identification information transmitted by the transmission unit has been received, wherein the installation unit comprises a search unit that searches a storage unit provided in the information processing apparatus or an external storage unit connected to the information processing apparatus, for the driver software corresponding to the image reading apparatus, and the installation unit installs the driver software found by the search unit, and wherein the installation unit further comprises a driver selecting unit that, when a plurality of driver software items have been found by the search unit, selects a driver software item to install from among the plurality of driver software items according to the priority order.

5. A method for controlling an image reading system in which a plurality of information processing apparatuses and an image reading apparatus capable of executing a specific scan mode are connected, the method comprising:

with the image reading apparatus,
selecting a transmission destination information processing apparatus to which image data read from an original is to be transmitted;
referring to registered information registered in advance in a memory and, when the selected transmission destination information processing apparatus has not been registered as an information processing apparatus for executing the specific scan mode, transmitting identification information for identifying the image reading apparatus,
wherein the identification information includes at least information indicating a plurality of protocols for performing communication between the transmission destination information processing apparatus and the image reading apparatus and information indicating a priority order according to which the plurality of protocols are to be used; and
displaying a screen for receiving a scan execution instruction on a display when a notification indicating that the transmission destination information processing apparatus is available as the information processing apparatus for executing the specific scan mode has been received, and with each information processing apparatus,
searching a storage unit provided in the information processing apparatus or an external storage unit connected to the information processing apparatus, for driver software corresponding to the image reading apparatus and, when a plurality of driver software items have been found by the searching, selecting a driver software item to install from among the plurality of driver software items according to the priority order;
installing the driver software corresponding to the image reading apparatus identified by the identification information when the identification information transmitted has been received; and
when the driver software has been installed, sending, to the image reading apparatus, a notification indicating that the transmission destination information processing apparatus is available as the information processing apparatus for executing the specific scan mode.

6. A method for controlling an image reading apparatus that is connected to a plurality of information processing apparatuses and capable of executing a specific scan mode, the method comprising:
selecting a transmission destination information processing apparatus to which image data read from an original is to be transmitted;
referring to registered information registered in advance in a memory and, when the selected transmission destination information processing apparatus has not been registered as an information processing apparatus for executing the specific scan mode, transmitting identification information for identifying the image reading apparatus,
wherein the identification information includes at least information indicating a plurality of protocols for performing communication between the transmission destination information processing apparatus and the image reading apparatus and information indicating a priority order according to which the plurality of protocols are to be used;
searching a storage unit provided in the transmission destination information processing apparatus or an external storage unit connected to the transmission destination information processing apparatus, for driver software corresponding to the image reading apparatus and, when a plurality of driver software items have been found by the searching, selecting a driver software item to install from among the plurality of driver software items according to the priority order; and
displaying a screen for receiving a scan execution instruction on a display when a notification indicating that the transmission destination information processing apparatus is available as the information processing apparatus for executing the specific scan mode has been received.

7. A method for controlling an image reading apparatus, the method comprising:
selecting an information processing apparatus to which image data read from an original is to be transmitted;
transmitting identification information for identifying the image reading apparatus to the information processing apparatus selected,
wherein the identification information includes at least information indicating a plurality of protocols for performing communication between the information processing apparatus and the image reading apparatus and information indicating a priority order according to which the plurality of protocols are to be used;
searching a storage unit provided in the information processing apparatus or an external storage unit connected to the information processing apparatus, for driver software corresponding to the image reading apparatus and, when a plurality of driver software items have been found by the searching, selecting a driver software item to install from among the plurality of driver software items according to the priority order;
receiving, from the information processing apparatus, a notification indicating that the driver software corresponding to the image reading apparatus is installed in the information processing apparatus based on the identification information;

enabling a reception of a read start instruction from a user upon receiving the notification, and transmitting a transmission instruction of a read start request to the information processing apparatus upon receiving the read start instruction from the user; and executing read processing of the original, and transmitting generated image data to the information processing apparatus upon receiving the read start request transmitted from the information processing apparatus in response to the transmission instruction.

8. A non-transitory computer-readable storage medium storing, in executable form, a computer program for causing a computer to execute the method for controlling an image reading system according to claim 5.

9. A non-transitory computer-readable storage medium storing, in executable form, a computer program for causing a computer to execute the method for controlling an image reading apparatus according to claim 6.

10. A non-transitory computer-readable storage medium storing, in executable form, a computer program for causing a computer to execute the method for controlling an image reading apparatus according to claim 7.

* * * * *